United States Patent
Tenny et al.

(10) Patent No.: US 8,634,313 B2
(45) Date of Patent: Jan. 21, 2014

(54) METHOD AND APPARATUS THAT FACILITATES A TIMING ALIGNMENT IN A MULTICARRIER SYSTEM

(75) Inventors: Nathan Edward Tenny, Poway, CA (US); Parag Arun Agashe, San Diego, CA (US); Peter Gaal, San Diego, CA (US); Tingfang Ji, San Diego, CA (US); Ravi Palanki, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 825 days.

(21) Appl. No.: 12/818,064

(22) Filed: Jun. 17, 2010

(65) Prior Publication Data
US 2011/0158116 A1 Jun. 30, 2011

Related U.S. Application Data

(60) Provisional application No. 61/218,769, filed on Jun. 19, 2009, provisional application No. 61/294,053, filed on Jan. 11, 2010, provisional application No. 61/305,014, filed on Feb. 16, 2010.

(51) Int. Cl.
*H04W 56/00* (2009.01)

(52) U.S. Cl.
USPC ............ 370/252; 370/336; 370/350; 370/503

(58) Field of Classification Search
USPC ......... 370/252, 329–338, 345, 347, 350, 503; 709/230; 455/450
See application file for complete search history.

(56) References Cited

U.S. PATENT DOCUMENTS 5,363,375 A  11/1994  Chuang et al.
6,321,083 B1 *  11/2001  Vaara et al. ................... 455/446
(Continued)

FOREIGN PATENT DOCUMENTS

EP  1887758 A2  2/2008
EP  1988648 A1  11/2008
(Continued)

OTHER PUBLICATIONS

E-Mail Rapporteur (NTT Docomo et al: "CA, support for multi-TA" 3GPP Draft; R2-101567, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; 20100222, Feb. 18, 2010, XP050421923 [retrieved on Feb. 18, 2010] paragraphs [0001]-[02.2].

(Continued)

*Primary Examiner* — Michael Thier
*Assistant Examiner* — Vincelas Louis
(74) *Attorney, Agent, or Firm* — Nerrie M. Zohn

(57) ABSTRACT

Aspects are disclosed for facilitating a timing alignment in a multicarrier system. In one aspect, at least one downlink timing associated with at least one downlink carrier is determined, and an uplink timing associated with an uplink group of carriers is ascertained based on at least one downlink timing and a timing offset associated with the uplink group of carriers. Each of the uplink group of carriers is then transmitted within a threshold value of the uplink timing. In another aspect, a downlink communication is transmitted to a wireless terminal via at least one downlink carrier. This embodiment further includes assigning a timing offset to an uplink group of carriers, and providing the timing offset to the wireless terminal via the at least one downlink carrier. An uplink communication is then received via the uplink group of carriers according to the timing offset.

88 Claims, 14 Drawing Sheets

(56) References Cited

U.S. PATENT DOCUMENTS

| | | | |
|---|---|---|---|
| 6,363,375 B1* | 3/2002 | Hoshino et al. | 1/1 |
| 6,545,996 B1* | 4/2003 | Falco et al. | 370/347 |
| 6,633,559 B1* | 10/2003 | Asokan et al. | 370/350 |
| 6,839,333 B1* | 1/2005 | Åkerberg | 370/330 |
| 6,967,936 B1* | 11/2005 | Laroia et al. | 370/329 |
| 7,254,118 B1* | 8/2007 | Terasawa et al. | 370/328 |
| 7,688,785 B2* | 3/2010 | Bachmann et al. | 370/331 |
| 8,400,935 B2* | 3/2013 | Pelletier et al. | 370/252 |
| 2004/0266445 A1* | 12/2004 | Burgess et al. | 455/450 |
| 2006/0274712 A1* | 12/2006 | Malladi et al. | 370/345 |
| 2006/0280142 A1* | 12/2006 | Damnjanovic et al. | 370/329 |
| 2008/0037487 A1* | 2/2008 | Li et al. | 370/338 |
| 2009/0228598 A1* | 9/2009 | Stamoulis et al. | 709/230 |
| 2009/0318175 A1* | 12/2009 | Sandberg | 455/502 |
| 2010/0142457 A1* | 6/2010 | Chun et al. | 370/329 |
| 2011/0075629 A1* | 3/2011 | Seo et al. | 370/330 |
| 2011/0235620 A1* | 9/2011 | Ahn et al. | 370/336 |
| 2011/0286411 A1* | 11/2011 | Kim et al. | 370/329 |
| 2011/0319116 A1* | 12/2011 | Iwamura et al. | 455/517 |
| 2012/0002617 A1* | 1/2012 | Vujcic | 370/329 |
| 2012/0120821 A1* | 5/2012 | Kazmi et al. | 370/252 |

FOREIGN PATENT DOCUMENTS

| | | |
|---|---|---|
| JP | 2009124450 A | 6/2009 |
| JP | 2009219625 A | 10/2009 |
| WO | 2009022840 A2 | 2/2009 |

OTHER PUBLICATIONS

Ericsson et al: "Multiple Timing Advance, for Carrier Aggregation" 3GPP Draft; R2-101196—Multiple TA for CA, 3rd Generation Partnership Project (3GPP), Mobile Competence Centre; 650, Route Des Lucioles; F-06921 Sophia-Antipolis Cedex; France, vol. RAN WG2, no. San Francisco, USA; 20100222, Feb. 16, 2010, XP050421769 [retrieved on Feb. 16, 2010] paragraphs [0001]-[02.2].

Ericsson: "Reference for Timing Advance" 3GPP Draft; R2-103106 Reference for Timnig Advance, 3rd Generation Partnership Project (3GPP), Mobile Competence Centre; 650, Route Des Lucioles; F-06921 Sophia-Antipolis Cedex; France, vol. RAN WG2, no. Montreal, Canada; 20100510, May 3, 2010, XP050423092 [retrieved on May 3, 2010] paragraphs [0001]-[0003].

International Search Report and Written Opinion—PCT/US2010/039372, International Search Authority—European Patent Office—Oct. 4, 2010.

RAN2: "LS on RAN2 status on carrier aggregation design" 3GPP Draft; R2-093599, 3rd Generation Partnership Project (3GPP), Mobile Competence Centre; 650, Route Des Lucioles; F-06921 Sophia-Antipolis Cedex; France, no. San Francisco, USA; 20090509, May 9, 2009, XP050341057 [retrieved on May 9, 2009] paragraph [0001].

Ericsson, "Impact of Carrier Aggregation on the L2 protocol architecture for LTE Rel-10", 3GPP TSG-RAN WG2 #66, TDOC R2-092957, San Francisco, USA, May 4-8, 2009, pp. 1-8, URL,http://www.3gpp.org/ftp/tsg_ran/WG2_RL2/TSGR2_66/docs/R2-092957.zip.

Taiwan Search Report—TW099120129—TIPO—May 27, 2013.

* cited by examiner

METHOD AND APPARATUS THAT FACILITATES A TIMING ALIGNMENT IN A MULTICARRIER SYSTEM

CROSS-REFERENCE TO RELATED APPLICATIONS

This application claims the benefit of U.S. Provisional Patent Application Ser. No. 61/218,769 entitled "TIMING ALIGNMENT IN A MULTICARRIER SYSTEM," which was filed Jun. 19, 2009, U.S. Provisional Patent Application Ser. No. 61/294,053 entitled "TIMING ALIGNMENT IN A MULTICARRIER SYSTEM," which was filed Jan. 11, 2010, and U.S. Provisional Patent Application Ser. No. 61/305,014 entitled "TIMING ALIGNMENT IN A MULTICARRIER SYSTEM," which was filed Feb. 16, 2009. The aforementioned applications are herein incorporated by reference in their entirety.

BACKGROUND

I. Field

The following description relates generally to wireless communications, and more particularly to methods and apparatuses that facilitate maintaining timing synchronization for user equipment in a multicarrier Long Term Evolution-Advanced (LTE-A) system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to timing synchronization in a single-carrier environment, it is noted that the maintenance of such timing synchronization for user equipment (UE) includes having the UE receive an uplink/downlink offset from the network, which occasionally needs to be updated, indicating how it should align its uplink transmissions in relation to the received downlink timing. In a multicarrier environment, however, the synchronization is more complex. Assuming that all carriers serving a single UE are transmitted from the same cell site, it appears that a common offset should be adequate. However, even co-sited carriers could experience some variation in timing for a number of reasons (e.g., cable delays, distance between the base station site and a remote radio head, etc.), which would make separate timing offsets per carrier beneficial or even necessary.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with maintaining timing synchronization for user equipment in a LTE-A system. In one aspect, methods and computer program products are disclosed that facilitate a timing alignment in a multicarrier system. These embodiments include determining at least one downlink timing associated with at least one downlink carrier, and ascertaining an uplink timing associated with an uplink group of carriers. For these embodiments, the uplink timing is ascertained based on a processing of at least one downlink timing and a timing offset associated with the uplink group of carriers. Each of the uplink group of carriers is then transmitted within a threshold value of the uplink timing.

In another aspect, an apparatus configured to facilitate a timing alignment in a multicarrier system is disclosed. Within such embodiment, the apparatus includes a processor configured to execute computer executable components stored in memory. The computer executable components include a downlink timing component, an uplink timing component, and a communication component. The downlink timing component is configured to determine at least one downlink timing associated with at least one downlink carrier, whereas the uplink timing component is configured to ascertain an uplink timing associated with an uplink group of carriers. For this embodiment, the uplink timing is ascertained based on at least one downlink timing and a timing offset associated with the uplink group of carriers. The communication component is then configured to transmit each of the uplink group of carriers within a threshold value of the uplink timing.

In a further aspect, another apparatus is disclosed. Within such embodiment, the apparatus includes means for determining, means for ascertaining, and means for transmitting. For this embodiment, the means for determining determines at least one downlink timing associated with at least one downlink carrier, whereas the means for ascertaining ascertains an uplink timing associated with an uplink group of carriers. For this embodiment, the uplink timing is ascertained based on at least one downlink timing and a timing offset associated with the uplink group of carriers. The means for transmitting then transmits each of the uplink group of carriers within a threshold value of the uplink timing. In other embodiments, the apparatus further includes a means for performing a random access procedure on at least one random access carrier. For this embodiment, the at least one random access carrier is included in a downlink group of carriers that includes the at least one downlink carrier.

In another aspect, other methods and computer program products are disclosed for facilitating a timing alignment in a multicarrier system. For these embodiments, various acts are provided, including an act to transmit a downlink communication to a wireless terminal via at least one downlink carrier. These embodiments further include assigning a timing offset to an uplink group of carriers, and providing the timing offset to the wireless terminal via the at least one downlink carrier. An uplink communication is then received via the uplink group of carriers according to the timing offset.

Another apparatus for facilitating a timing alignment in a multicarrier system is also disclosed. Within such embodiment, the apparatus includes a processor configured to execute computer executable components stored in memory. The computer executable components include a timing offset component, a transmitting component, and a receiving component. The timing offset component is configured to assign a timing offset to an uplink group of carriers, whereas the transmitting component is configured to provide the timing offset to a wireless terminal via at least one downlink carrier. The receiving component is then configured to receive an uplink communication via the uplink group of carriers according to the timing offset.

In a further aspect, another apparatus is disclosed. Within such embodiment, the apparatus includes means for transmitting, means for assigning, means for providing, and means for receiving. For this embodiment, the means for transmitting transmits at least one downlink carrier to a wireless terminal. The means for assigning then assigns a timing offset to an uplink group of carriers, whereas the means for providing provides the timing offset to the wireless terminal via the at least one downlink carrier. The means for receiving then receives an uplink communication via the uplink group of carriers according to the timing offset. In another embodiment, the apparatus further includes a means for generating a timing message. For this embodiment, the timing message includes a set of uplink timing instructions which are provided to the wireless terminal.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
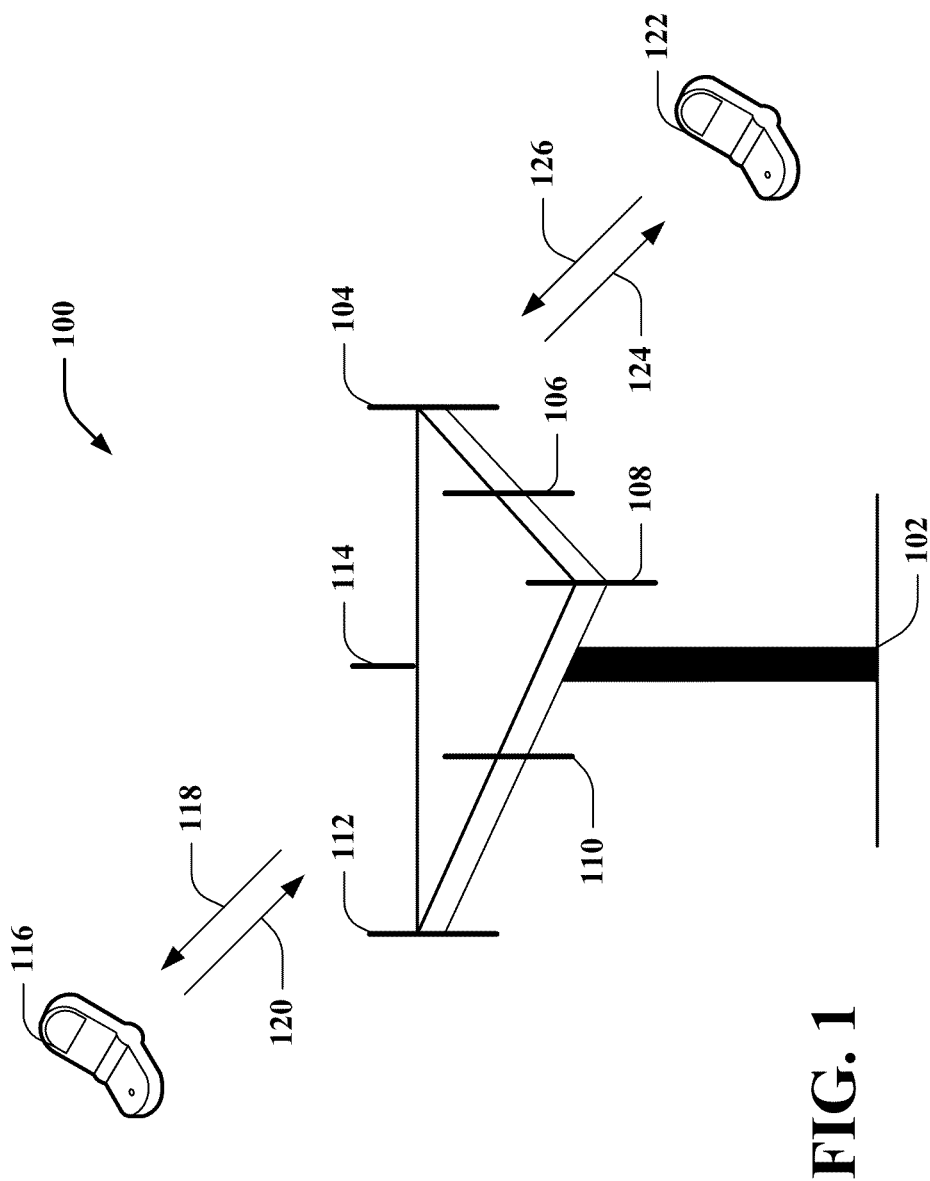
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards facilitating a timing alignment for user equipment in systems with multiple carriers whose timing may be different. Exemplary embodiments are disclosed in which carriers are grouped into "timing groups" with the similar timing information (within a tolerance), wherein signaling behavior for timing synchronization takes place on a per-group basis rather than a per-carrier basis.

To this end, it is noted that the techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
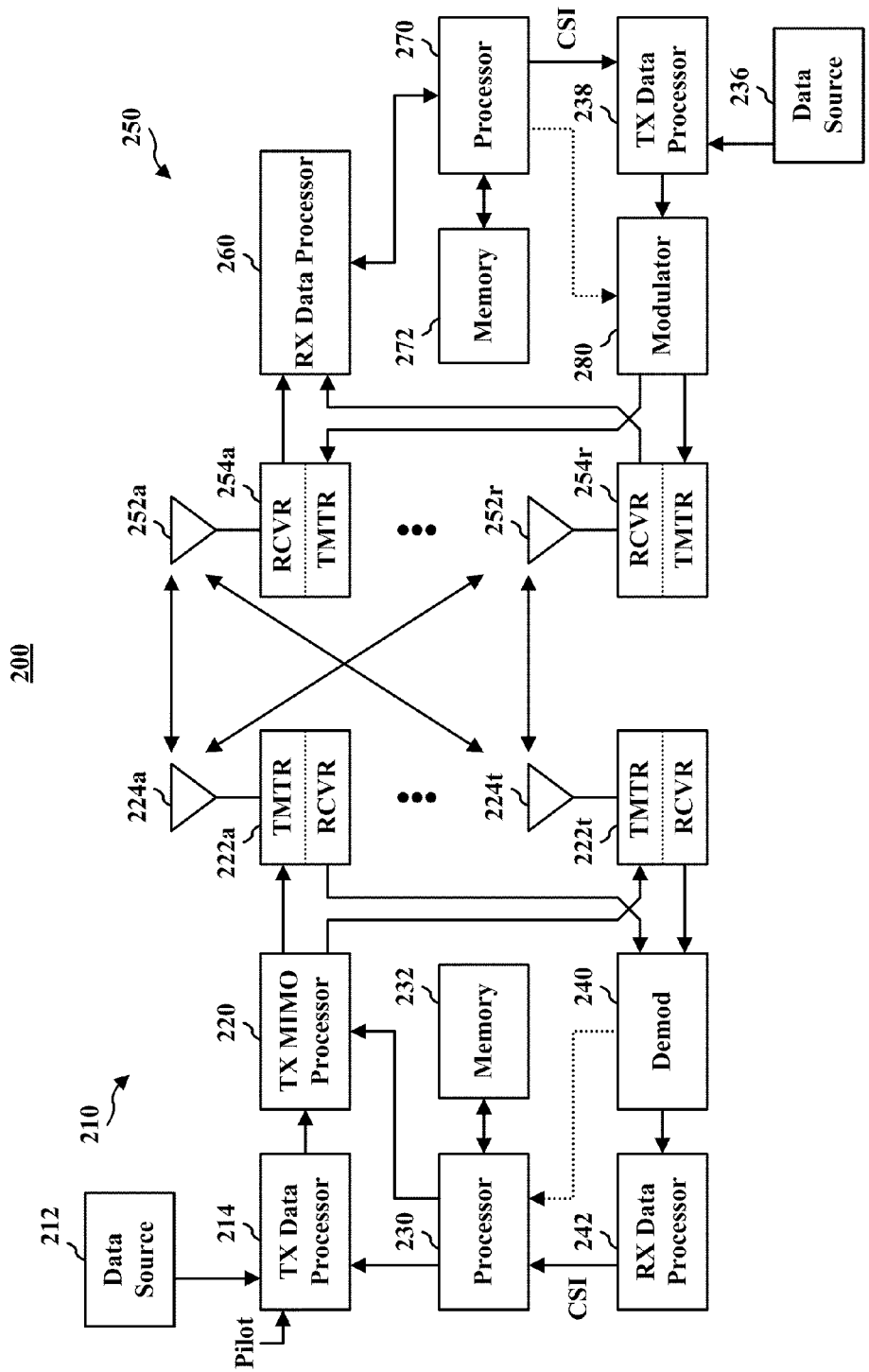
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

As a general framework, aspects disclosed herein are directed towards assigning a UE to at least one "timing group", which hereinafter refers to a group of carriers with uplink timings that are the same to within some tolerance. Depending on the tolerance, a timing group might include carriers that share a common controlling site (but may still have fine differences in timing), or only of carriers whose antennae are collocated. For some embodiments, different carriers with synchronized downlinks, but significant differences in uplink timing for a given UE (e.g., from different cell sites in a synchronous network), would thus not normally belong to the same timing group.

In an aspect, it is contemplated that a UE may be assigned carriers from multiple timing groups. In principle, a UE with enough reception and decoding capabilities could listen to several sets of carriers with independent timing. Such a situation may, for example, arise if a UE were assigned to carriers from different cell sites. However, with the current LTE design (with no soft handover), and the complexities that arise when attempting to design such a system, a multiple-site assignment seems unlikely.

Figure 3:
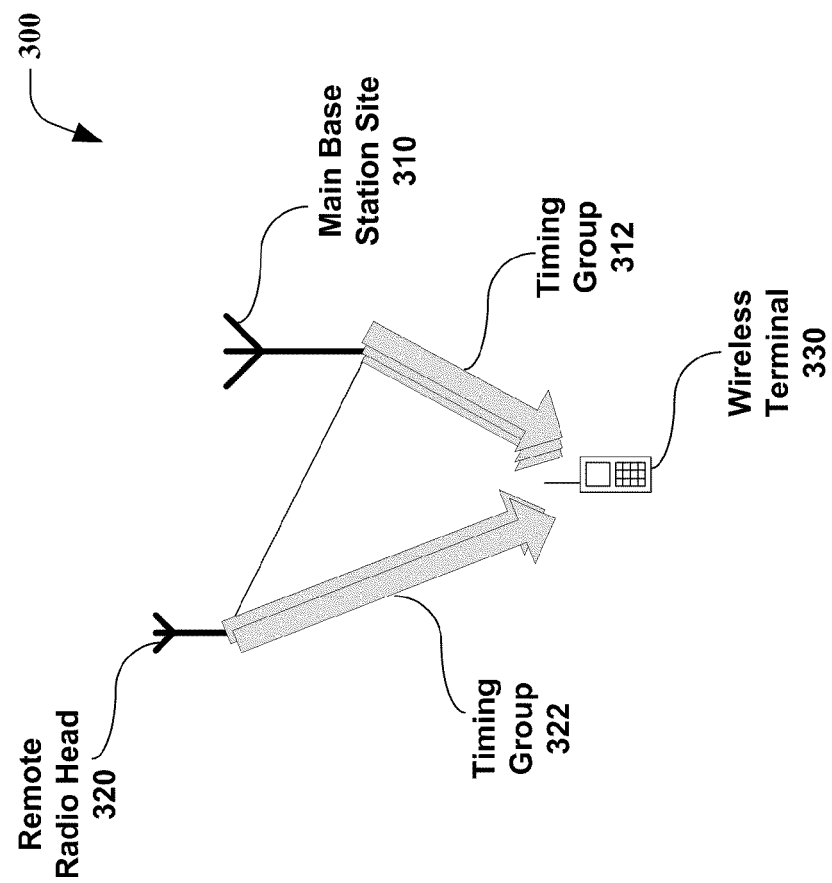
FIG. 3 is an illustration of an exemplary system where two timing groups are associated with a single eNodeB according to an embodiment.

Even so, if the tolerances defining a timing group are adequate, it is possible that a UE could be assigned carriers from multiple timing groups originating from the same cell site. For instance, in FIG. 3, an exemplary system illustrates how two timing groups may originate from a single eNode B. As illustrated, system 300 includes a remote radio head 320 belonging to main base station site 310, wherein carriers from remote radio head 320 are associated with timing group 322, whereas carriers from main base station site 310 are associated with timing group 312. Accordingly, wireless terminal 330 receives carriers having different timings from a single eNodeB, wherein carriers within a timing difference tolerance are grouped together. In such a case, since wireless terminal 330 could be assigned to carriers in both timing group 312 and timing group 322, it is contemplated that wireless terminal 330 will maintain timing separately for each group. For some embodiments, this might require separate timing advance procedures for each group, or enhanced signaling allowing timing maintenance to take place for all groups in parallel.

In an aspect, embodiments directed towards selecting carriers for performing a random access procedure are also contemplated. Indeed, within each timing group, a UE may occasionally perform random access to update its timing (e.g., if timing is maintained through a separate procedure for each timing group). Here, although this update only needs to be performed with one carrier of each timing group, the issue arises of how the UE should decide which carrier this is. In an aspect, the UE is configured to avoid performing unnecessary timing updates (i.e., to select a single carrier from the timing group to use for its timing control).

In principle, it is noted that performing random access on any carrier in a timing group should work. However, it is desirable to avoid situations in which a large number of UEs concentrate their random access attempts on a particular carrier, to minimize contention on the random access channel. To this end, it is contemplated that the system could adopt either a UE-based or a network-based solution.

In an exemplary network-based solution, the UE is assigned to carriers in a particular timing group, wherein the network provides the UE with instructions regarding which carrier in that group to use for random access. Within such embodiment, the instructions could be absolute (e.g., "always use this carrier") or subject to relaxation based on conditions at the UE (e.g., "use this carrier preferentially, unless radio conditions on that carrier are worse than indicated by a threshold").

In an exemplary UE-based approach, each UE selects a single carrier for random access for timing updates autonomously. Here, similar to the exemplary network-based solution, the determination of the carrier could be absolute or subject to modification. In a particular embodiment, carrier selection is based on a function that tends to distribute UEs more or less evenly across the timing group. A hash function may be utilized, for example, in which a UE associated with a timing group of n carriers provides some input to a hash function with n possible values, wherein the function's output is the index of the carrier of the group that the UE will (prefer to) use for random access. Here, it is noted that there are many options for an appropriate hash function including, for example, using a UE identifier as an input, as well as other values such as an eNode B identifier. It is further noted that the inputs could be static or time-varying. If they are static (depending on characteristics of the UE and/or the serving eNode B), the UE may tend to use the same carrier for random access throughout its assignment to a particular group whereas, if the inputs vary with time (e.g., through the use of an input value derived from a time measurement, a counter, etc.), the UE may tend to "cycle" through the available carriers. For some embodiments, the latter approach may be preferable, since coincidental "spikes" in concentration (e.g., when a particular site is serving a large number of UEs whose identities result in the same output from the hash function) will tend to correct themselves over time.

Other UE-based distribution mechanisms are also contemplated. For instance, instead of a fixed hash function, the UE could use a pseudorandom function to choose the carrier. In such a case, the determination could be made only at the time of carrier assignment (so that a given UE consistently uses the same carrier for timing) or at each request for a timing update (so that each UE tends to balance its requests across the available carriers).

Issues pertaining to timing alignment granularity are now discussed. To this end, it is noted that, if all carriers within a timing group are precisely aligned in both downlink and uplink timing, there is no ambiguity about what the "correct" timing alignment for a given UE should be. However, in the case of small differences between carrier transmission timing (e.g., due to cable delays), carriers with the same timing offset may nevertheless have different absolute timings.

Figure 4:
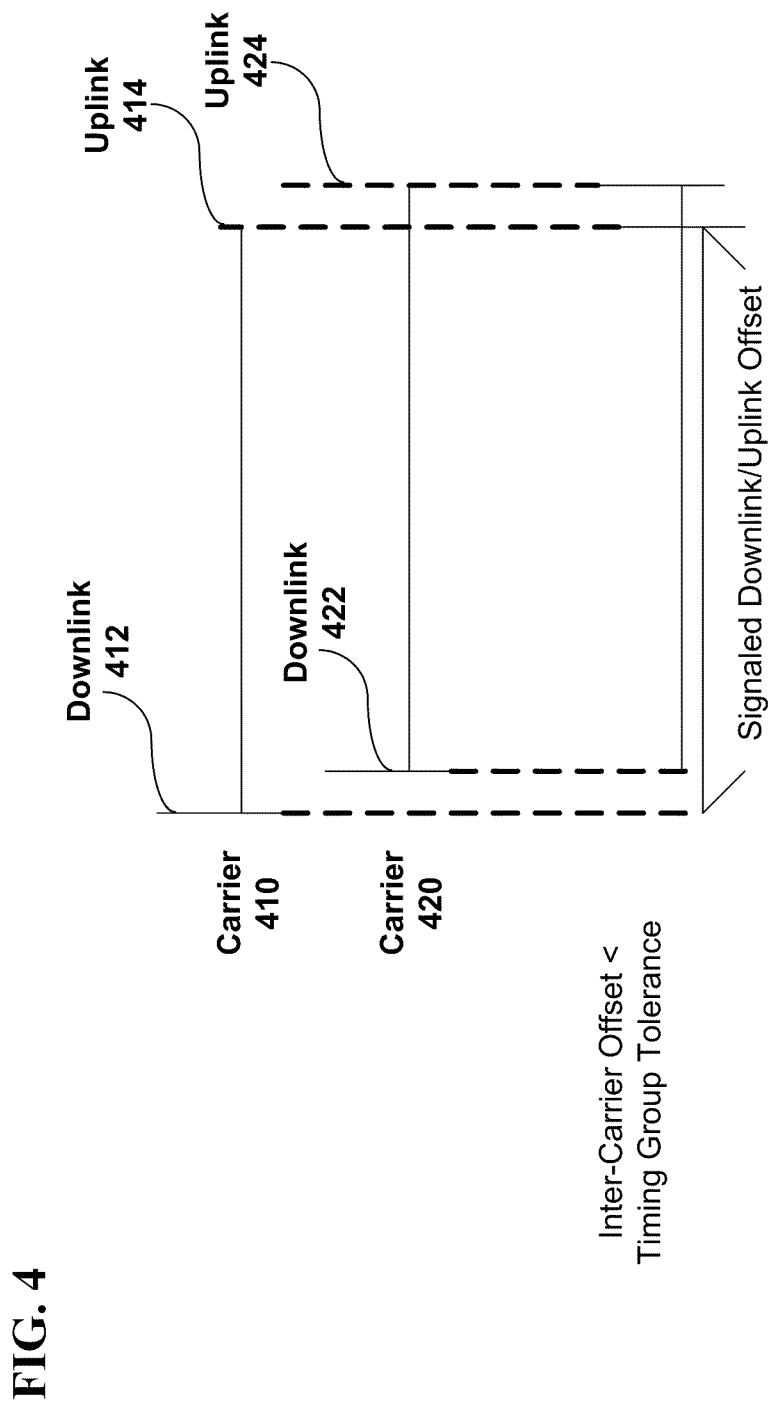
FIG. 4 is an illustration of an exemplary ambiguous uplink timing.

An exemplary timing diagram illustrating such ambiguous uplink timing is provided in FIG. 4. As illustrated, carrier 410 is associated with downlink 412 and uplink 414, whereas carrier 420 is associated with downlink 422 and uplink 424. Here, it is noted that a UE in such environment could receive its timing information from either carrier 410 or carrier 420. In an aspect, the timings of carrier 410 and carrier 420 may differ, but by less than the tolerance that the deployment requires for a timing group. It thus follows that, depending on which carrier the UE received its last update from, a UE connected to carrier 410 and carrier 420 could consider the correct uplink timing to be at either uplink 414 or uplink 424.

In a particular embodiment, the UE applies the timing offset to the carrier on which it received the timing offset, and assumes that the timing of other carriers in the group is "close enough". With respect to FIG. 4, this would mean that the system considered uplink 414 and uplink 424 to be the same for purposes of uplink timing accuracy.

As an alternative, however, the UE could apply the timing offset, not to the received downlink timing from the carrier that transmitted the offset, but to the average timing of the carriers in the timing group. In such a case, although the UE received its timing information from a particular carrier, it tracks the (downlink) timing of each carrier in the group separately, so that when a single downlink/uplink offset is received, the UE can apply the offset separately to each carrier and take an average of the results to provide an "adequate" uplink timing for use with all carriers in the group. Such an averaging behavior could be either a specified UE behavior (to allow greater downlink tolerances within a timing group while still keeping the variation in uplink timing acceptable) or left to UE implementation.

Figure 5:
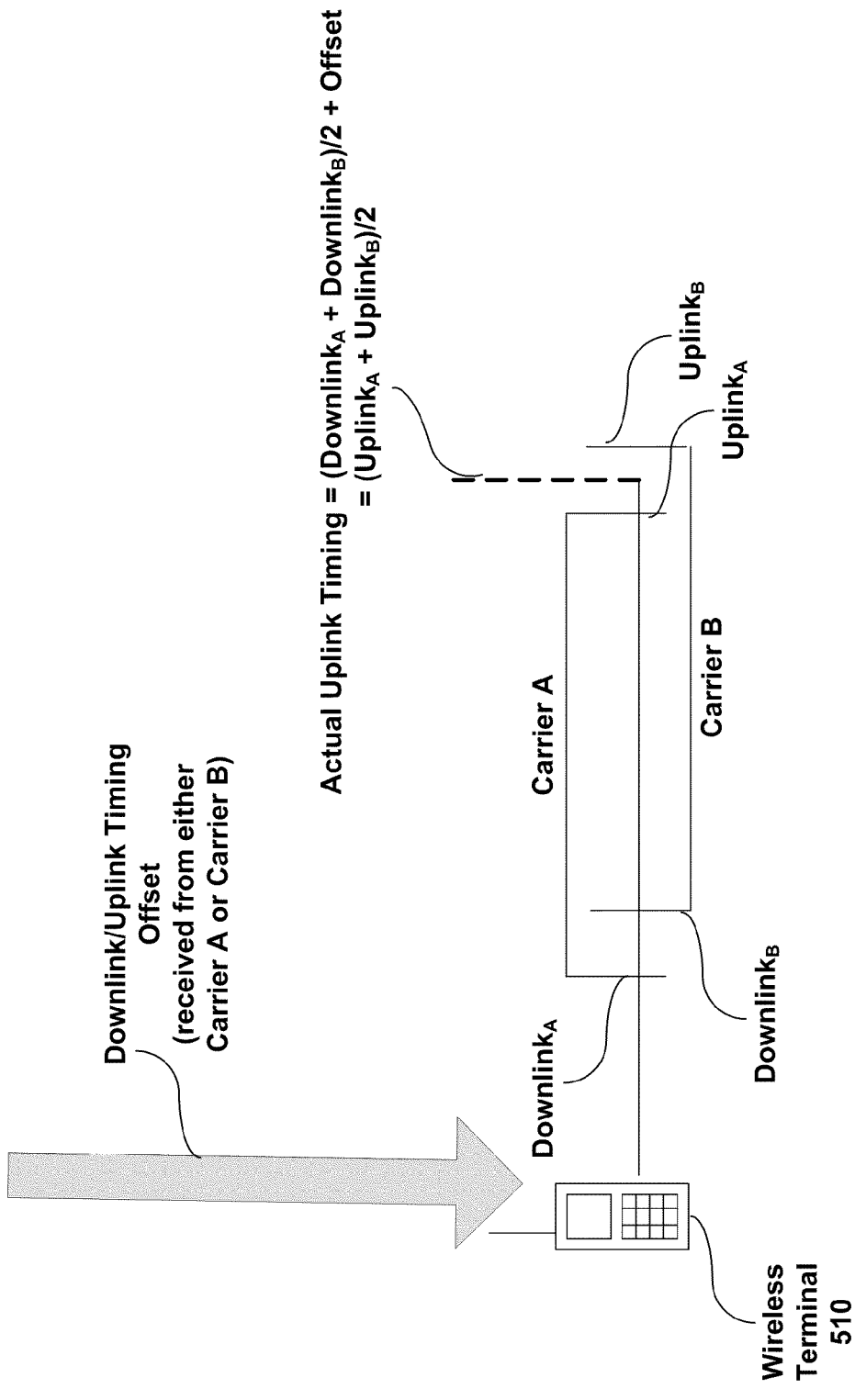
FIG. 5 is an illustration of an exemplary averaging of uplink timings according to an embodiment.

In FIG. 5, an illustration of an exemplary averaging procedure is provided. As illustrated, wireless terminal 510 receives a downlink/uplink offset via either of Carrier A or Carrier B. For this particular example, Carrier A is associated with $Downlink_A$ and $Uplink_A$, whereas Carrier B is associated with $Downlink_B$ and $Uplink_B$. The actual uplink timing may then be ascertained by adding the timing offset to the average of $Downlink_A$ and $Downlink_B$, which is equal to the average of $Uplink_A$ and $Uplink_B$.

For some embodiments, in the event that a UE is assigned to several timing groups that are controlled from a common site, the UE may receive timing adjustments for all groups with a single interaction with the base station. Indeed, such a procedure is essentially a signaling optimization since the UE could, in principle, receive the same information by performing a separate timing adjustment for each group. Sending the adjustments as a vector, however, reduces over-the-air activity, and in particular random access procedures, which are expensive in terms of radio resources and UE battery life.

To implement such a command, the network may need to be aware of the timing groups in which the UE is assigned to at least one carrier. This knowledge could be maintained autonomously in the network, so that upon determining the need to signal a timing advance to a particular UE, the network automatically includes timing advance commands for all appropriate timing groups. Alternatively, the UE could request timing advance values for a particular set of timing groups (e.g., the groups for which the UE's time-alignment timers are within some range of expiring). However, the request for particular groups would represent a new medium access control (MAC) element, which may need to be transmitted over the air at random access with a potentially significant cost in radio resources. For some embodiments, it may therefore be desirable for the network to maintain knowledge of what timing groups require timing advance commands towards a particular UE.

In another aspect of this vector approach, the network could opt to send only a single timing advance command per MAC element, but indicate which timing group the value is associated with. Such approach would minimize the specification impact to the concerned MAC control element, since the existing information only needs to be augmented by a group identifier. It is presumed that such an identifier could be sent with a small number of bits (e.g., as an index into the set of timing groups with which the UE was configured). Such a mapping could be established by explicit signaling (in higher layers such as the Radio Resource Control) at the time the UE is configured with particular carriers.

Figure 6:
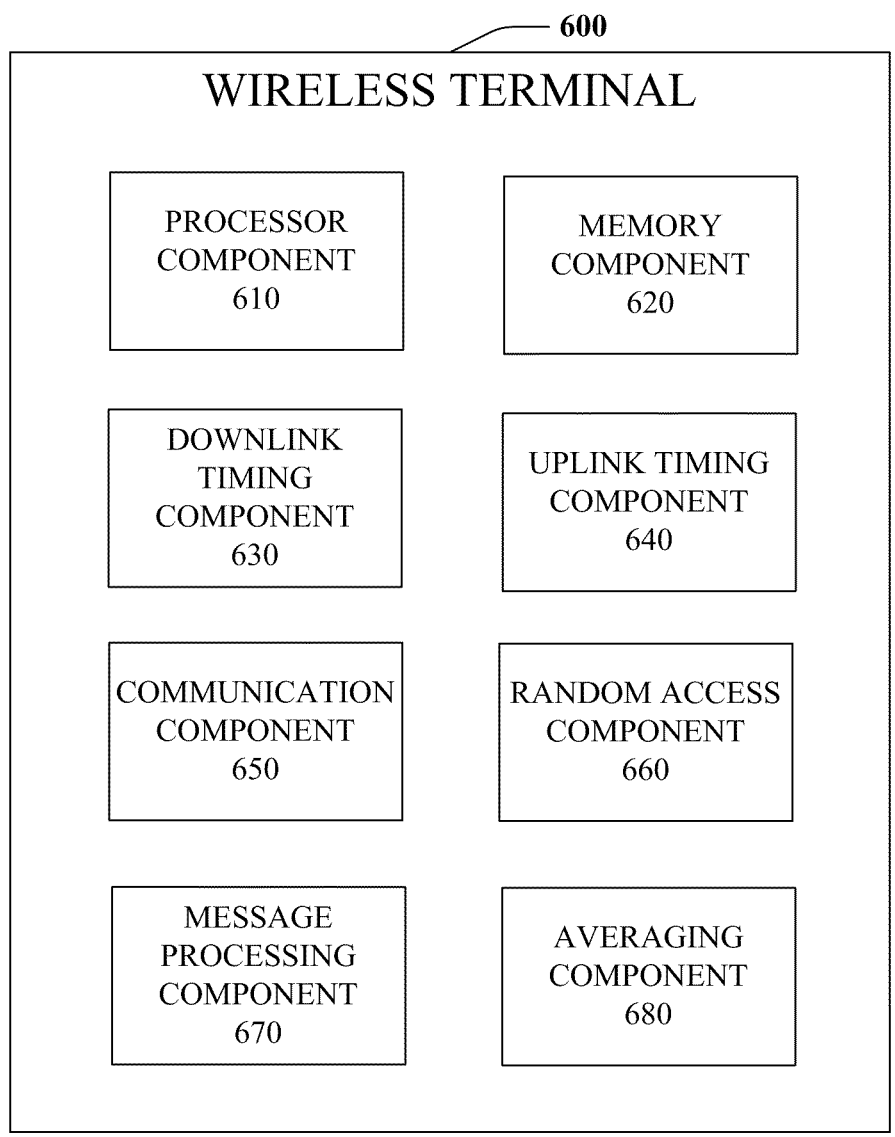
FIG. 6 illustrates a block diagram of an exemplary wireless terminal that facilitates a timing alignment in a multicarrier system in accordance with an aspect of the subject specification.

Referring next to FIG. 6, a block diagram of an exemplary wireless terminal that facilitates a timing alignment in a multicarrier system according to an embodiment is provided. As shown, wireless terminal 600 may include processor component 610, memory component 620, downlink timing component 630, uplink timing component 640, communication component 650, random access component 660, message processing component 670, and averaging component 680.

In one aspect, processor component 610 is configured to execute computer-readable instructions related to performing any of a plurality of functions. Processor component 610 can be a single processor or a plurality of processors dedicated to analyzing information to be communicated from wireless terminal 600 and/or generating information that can be utilized by memory component 620, downlink timing component 630, uplink timing component 640, communication component 650, random access component 660, message processing component 670, and/or averaging component 680. Additionally or alternatively, processor component 610 may be configured to control one or more components of wireless terminal 600.

In another aspect, memory component 620 is coupled to processor component 610 and configured to store computer-readable instructions executed by processor component 610. Memory component 620 may also be configured to store any of a plurality of other types of data including generated by any of downlink timing component 630, uplink timing component 640, communication component 650, random access component 660, message processing component 670, and/or averaging component 680. Memory component 620 can be configured in a number of different configurations, including as random access memory, battery-backed memory, hard disk, magnetic tape, etc. Various features can also be implemented upon memory component 620, such as compression and automatic back up (e.g., use of a Redundant Array of Independent Drives configuration).

As illustrated, wireless terminal 600 may also include downlink timing component 630 and uplink timing component 640. Within such embodiment, downlink timing component 630 is configured to determine at least one downlink timing associated with at least one downlink carrier, whereas uplink timing component 640 is configured to ascertain an uplink timing associated with an uplink group of carriers based on at least one downlink timing and a timing offset associated with the uplink group of carriers. In an aspect, uplink timing component 640 is configured to determine the uplink timing by utilizing a different timing offset for each of a plurality of uplink group of carriers. Uplink timing component 640 may also be configured to determine the uplink timing by utilizing a different downlink timing for each of a plurality of uplink group of carriers.

In other aspects, the at least one downlink carrier is included in one of a plurality of downlink groups. Within such embodiment, uplink timing component 640 may be configured to determine the uplink timing by associating the uplink group of carriers with the one of the plurality of downlink groups. In a particular aspect, uplink timing component 640 is configured to determine a plurality of uplink timings respectively associated with a plurality of uplink groups. Here, uplink timing component 640 ascertains the plurality of uplink timings by identifying a subset of downlink groups that include an assigned carrier, wherein the plurality of uplink groups are respectively associated with the subset of downlink groups that include the assigned carrier.

In yet another aspect, wireless terminal 600 includes communication component 650, which is coupled to processor component 610 and configured to interface wireless terminal 600 with external entities. For instance, communication component 650 may be configured to transmit uplink carriers of a common uplink group according to the uplink timing ascertained by uplink timing component 640. In a particular embodiment, each of the uplink group of carriers is transmitted within a threshold value of the corresponding uplink timing.

As illustrated, wireless terminal 600 may also include message processing component 670. Within such embodiment, message processing component 670 is configured to process a received timing message encoded with a set of uplink timing instructions respectively corresponding to an uplink group subset of the uplink group of carriers. In a particular aspect, message processing component 670 is configured to associate the uplink group of carriers with one of a plurality of downlink groups, wherein the timing message is encoded with a set of uplink timing instructions respectively corresponding to a downlink group subset of the plurality of downlink groups. Here, it should be noted that the received timing message may be a timing advance command, and/or may comprise a vector encoded with timing adjustment values associated with the uplink group subset.

Particular embodiments are also contemplated wherein the uplink group subset includes assigned carriers. For instance, in one embodiment, each uplink group within the uplink group subset includes at least one carrier with an assigned radio resource. In another embodiment, the uplink group of carriers comprises a set of uplink groups in which each uplink group includes at least one carrier with an assigned radio resource, wherein the uplink group subset is a subset of the set of uplink groups.

For some embodiments, it is contemplated that the uplink group subset is determined by a network entity. For instance, message processing component 670 may be configured to submit a request requesting the network entity to provide the uplink group subset, wherein the uplink group subset is determined by the network entity in response to the request. Indeed, it should be noted that the received timing message itself may include an indication of which of the uplink group of carriers are included in the uplink group subset. For such embodiments, message processing component 670 may be configured to decode the indication according to a mapping of group identities shared with the network. In an aspect, the mapping of group identities is configured in association with an assignment of dedicated radio resources on uplink carriers within at least one uplink group of the uplink group subset.

Timing messages which include inter-group uplink timings are also contemplated. For instance, message processing component 670 may be configured to decode a timing message received via a timing message carrier included in a messenger downlink group, wherein the timing message is encoded with at least one inter-group uplink timing. Here, the inter-group uplink timing is an uplink timing corresponding to a target downlink group, wherein the target downlink group is different than the messenger downlink group. For these embodiments, the timing message may include an indication of the target downlink group, message processing component 670 may again be configured to decode the indication according to a mapping of group identities shared with the network. For instance, the mapping of group identities may be configured in association with an assignment of dedicated radio resources on downlink carriers included in the target downlink group.

In another aspect, rather than using any particular downlink timing, the subject innovation contemplates utilizing a plurality of downlink timings. To this end, wireless terminal 600 may further include averaging component 680, which is configured to compute an average downlink timing from a plurality of downlink timings. Within such embodiment, the plurality of downlink timings respectively correspond to a set of downlink carriers within a particular downlink group that includes the at least one downlink carrier. Here, uplink timing component 640 is then configured to determine the uplink timing by applying the timing offset to the average downlink timing. With respect to the particular downlink group utilized by averaging component 680, it is contemplated that such downlink group may be a particular downlink group that comprises at least one carrier associated with an assigned radio resource. Alternatively, the particular downlink group comprises a set of carriers identified by the network.

Wireless terminal 600 may also include random access component 660, which is configured to perform a random access procedure. Within such embodiment, random access component 660 is configured to perform the random access procedure on at least one random access carrier included in a downlink group of carriers that includes the at least one downlink carrier received from the network. In a particular aspect, the random access procedure is performed on a single carrier, wherein the single carrier is an assigned carrier provided by a network prior to the performing of the random access procedure. Alternatively, the random access procedure may include receiving the single carrier as part of a dedicated radio resource configuration.

In another embodiment, a criterion for selecting the appropriate carrier is utilized. For instance, the random access procedure may include receiving a criterion associated with a usage of the single carrier, wherein the criterion is received with an assignment of the single carrier. Within such embodiment, the criterion may be a minimum signal quality threshold associated with the single carrier. Here, it is also contemplated that random access component 660 may be configured to perform the random access procedure on an alternative carrier in response to the criterion not being met by the single carrier. For such embodiment, random access component 660 may be configured to receive an indication of the alternative carrier from the network. Alternatively, the alternative carrier is independently selected by random access component 660.

In addition to selecting the alternative carrier, it is also contemplated that the single carrier is independently selected by random access component 660. Within such embodiment, the selecting may comprise applying a determination function across a set of available carriers in the downlink group of carriers. Here, it is contemplated that any of a plurality of determination functions may be utilized including, for example, a pseudorandom function and/or a hash function.

For instance, if a hash function is implemented, the random access procedure may include inputting an identifier into the hash function, wherein the identifier can be associated with the wireless terminal and/or a network node (wherein the downlink group of carriers is controlled by the network node). Embodiments are also contemplated in which the procedure includes inputting a time-varying value into the hash function. For such embodiments, the procedure may further include determining the time-varying value via a time measurement taken from within wireless terminal 600. The procedure may also include modifying the time-varying value by an arithmetic operation each time the time-varying value is used.

In another aspect, random access component 660 is configured to select the random access carrier at a particular time. For instance, the selecting procedure may be performed at a time when radio resources are assigned to wireless terminal 600 on any of the downlink group of carriers. Alternatively, the selecting is performed in response to a triggering of the random access procedure.

Figure 7:
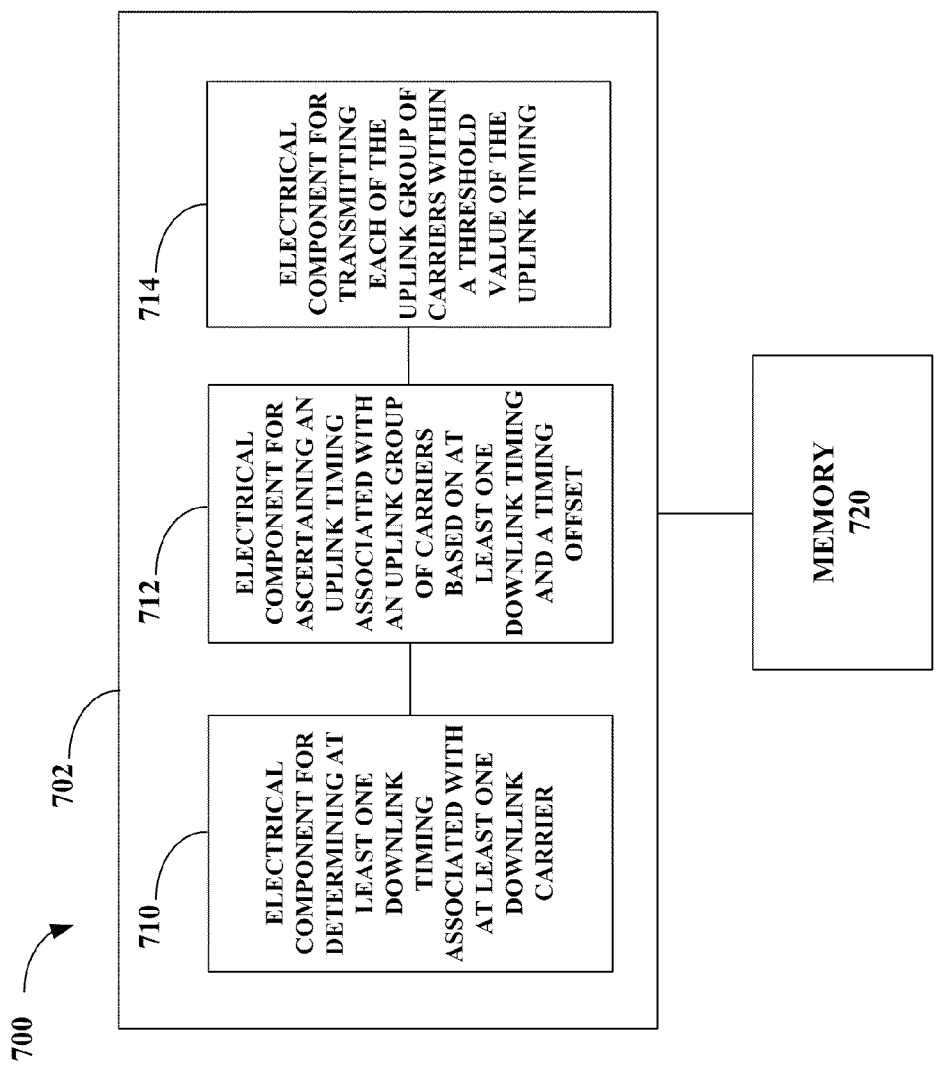
FIG. 7 is an illustration of an exemplary coupling of electrical components that effectuate a timing alignment in a multicarrier system.

Turning to FIG. 7, illustrated is a system 700 that facilitates a timing alignment in a multicarrier system according to an embodiment. System 700 and/or instructions for implementing system 700 can reside within user equipment (e.g., wireless terminal 600) or a computer-readable storage medium, for instance. As depicted, system 700 includes functional blocks that can represent functions implemented by a processor, software, or combination thereof (e.g., firmware). System 700 includes a logical grouping 702 of electrical components that can act in conjunction. As illustrated, logical grouping 702 can include an electrical component for determining at least one downlink timing associated with at least one downlink carrier 710. Logical grouping 702 can also include an electrical component for ascertaining an uplink timing associated with an uplink group of carriers based on at least one downlink timing and a timing offset 712. Further, logical grouping 702 can include an electrical component for transmitting each of the uplink group of carriers within a threshold value of the uplink timing 714. Additionally, system 700 can include a memory 720 that retains instructions for executing functions associated with electrical components 710, 712, and 714, wherein any of electrical components 710, 712, and 714 can exist either within or outside memory 720.

Figure 8:
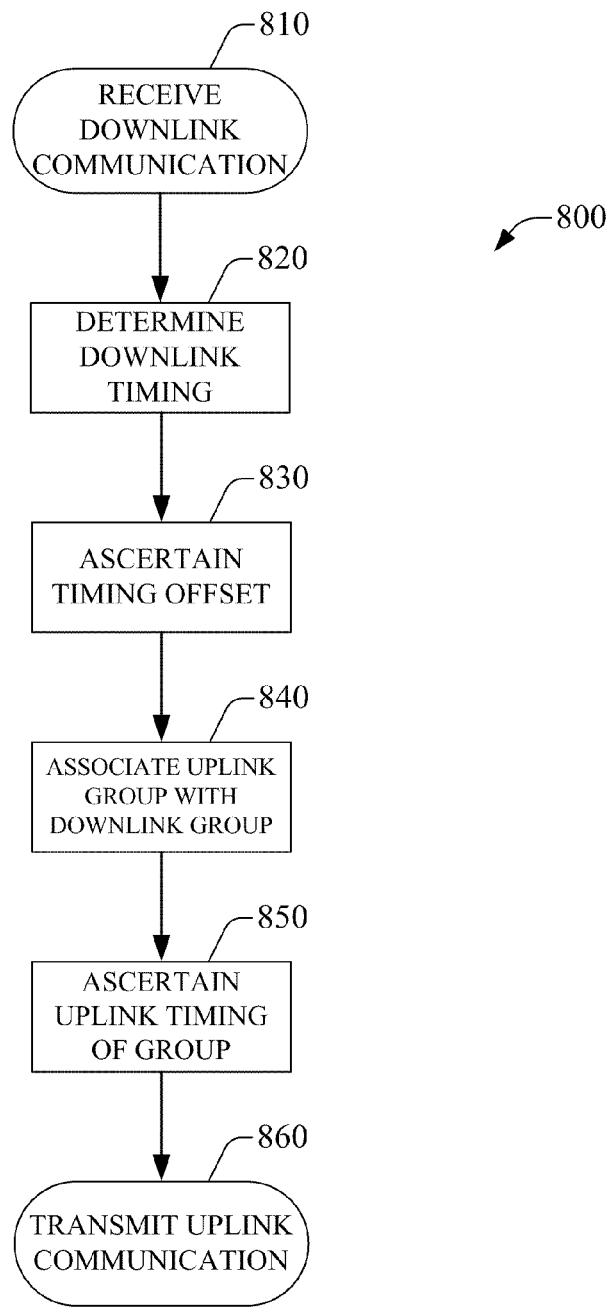
FIG. 8 is a flow chart illustrating an exemplary methodology for facilitating a timing alignment in a multicarrier system in accordance with an aspect of the subject specification.

Referring next to FIG. 8, a flow chart illustrating an exemplary method for facilitating a timing alignment in a multicarrier system is provided. As illustrated, process 800 includes a series of acts that may be performed by various components of user equipment (e.g., wireless terminal 600) according to an aspect of the subject specification. Process 800 may be implemented by employing at least one processor to execute computer executable instructions stored on a computer readable storage medium to implement the series of acts. In another embodiment, a computer-readable storage medium comprising code for causing at least one computer to implement the acts of process 800 is contemplated.

In an aspect, process 800 begins with a downlink communication being received at act 810. Here, the downlink communication is a multicarrier communication, wherein at least one downlink carrier is associated with a downlink group. Process 800 then proceeds to act 820 where a downlink timing of the downlink carrier is determined, followed by act 830 where a timing offset of the downlink carrier's timing group is ascertained.

Next, at act 840, an uplink group of carriers is associated with the downlink group of carriers. An uplink timing for the uplink group is then ascertained based on the downlink timing and timing offset, at act 850. Process 800 then concludes at act 860 where an uplink communication is transmitted via the uplink group of carriers according to the particular uplink timing of the uplink group. Moreover, for this particular example, each of the uplink carriers of an uplink group are transmitted within a threshold tolerance of the uplink timing associated with the group.

Figure 9:
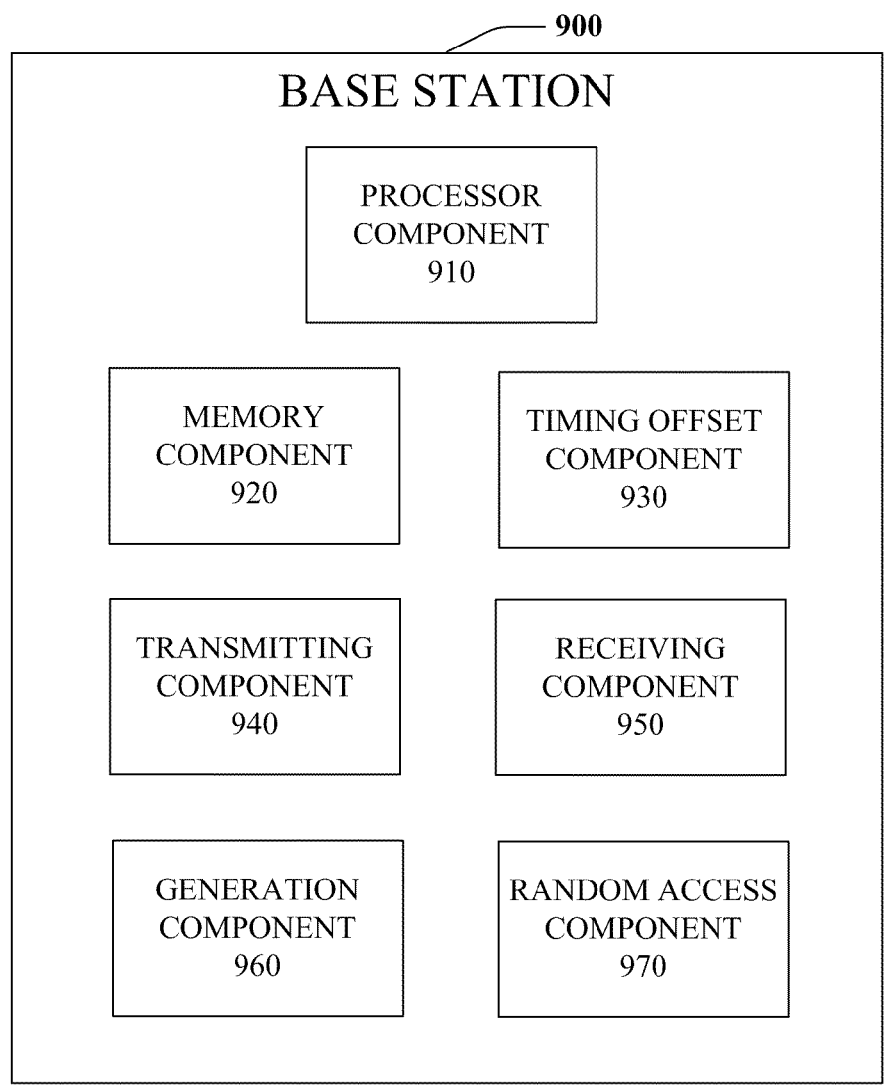
FIG. 9 illustrates a block diagram of an exemplary base station that facilitates a timing alignment in a multicarrier system in accordance with an aspect of the subject specification.

Referring next to FIG. 9, a block diagram illustrates an exemplary base station that facilitates a timing alignment in a multicarrier system in accordance with various aspects. As illustrated, base station 900 may include processor component 910, memory component 920, timing offset component 930, transmitting component 940, receiving component 950, generation component 960, and random access component 970.

Similar to processor component 610 in wireless terminal 600, processor component 910 is configured to execute computer-readable instructions related to performing any of a plurality of functions. Processor component 910 can be a single processor or a plurality of processors dedicated to analyzing information to be communicated from base station 900 and/or generating information that can be utilized by memory component 920, timing offset component 930, transmitting component 940, receiving component 950, generation component 960, and/or random access component 970. Additionally or alternatively, processor component 910 may be configured to control one or more components of base station 900.

In another aspect, memory component 920 is coupled to processor component 910 and configured to store computer-readable instructions executed by processor component 910. Memory component 920 may also be configured to store any of a plurality of other types of data including data generated by any of timing offset component 930, transmitting component 940, receiving component 950, generation component 960, and/or random access component 970. Here, it should be noted that memory component 1220 is analogous to memory component 620 in wireless terminal 600. Accordingly, it should be appreciated that any of the aforementioned features/configurations of memory component 620 are also applicable to memory component 920.

As illustrated, base station 900 may also include timing offset component 930. Within such embodiment, timing offset component 930 is configured to assign a timing offset to an uplink group of carriers. For instance, in a particular embodiment, timing offset component 930 is configured to assign a different timing offset to each of a plurality of uplink groups.

In another aspect, base station 900 includes transmitting component 940 and receiving component 950, which are coupled to processor component 910 and configured to interface base station 900 with external entities. For instance, transmitting component 940 may be configured to provide the timing offset ascertained by timing offset component 930 to a wireless terminal via at least one downlink carrier, whereas receiving component 950 may be configured to receive an uplink communication via the uplink group of carriers according to the timing offset. In a particular embodiment, transmitting component 940 is configured to transmit a downlink group of carriers from antennas located at a common site. In another embodiment, transmitting component 940 is configured to identify a set of carriers respectively corresponding to a plurality of downlink timings to facilitate an averaging of the plurality of downlink timings performed by the wireless terminal.

As illustrated, base station 900 may also include generation component 960. Within such embodiment, generation component 960 is configured to generate a timing message encoded with a set of uplink timing instructions. For instance, such instructions may include uplink timing instructions respectively corresponding to an uplink group subset of the plurality of uplink groups, wherein transmitting component 940 is configured to transmit the timing message to a wireless terminal. Here, it should be noted that the timing message may be a timing advance command, and/or may comprise a vector encoded with timing adjustment values associated with the uplink group subset.

Particular embodiments are also contemplated wherein the uplink group subset includes assigned carriers. For instance, in one embodiment, each uplink group within the uplink group subset includes at least one carrier with a radio resource assigned to the wireless terminal. In another embodiment, the plurality of uplink groups comprise a set of uplink groups in which each uplink group within the set of uplink groups includes at least one carrier with a radio resource assigned to the wireless terminal, wherein the uplink group subset is a subset of the set of uplink groups.

In another aspect, it should be noted that base station 900 may include components to facilitate determining the uplink group subset. Such embodiment may, for example, include receiving a request from the wireless terminal to provide the uplink group subset, wherein the determining is performed in response to the request. Generation component 960 may also be configured to generate timing messages encoded with an indication of which of the plurality of uplink groups are included in the uplink group subset. In an exemplary embodiment, the indication is encoded according to a mapping of group identities shared with the wireless terminal. For this embodiment, the mapping of group identities may be configured in association with an assignment of dedicated radio resources on uplink carriers within at least one uplink group of the uplink group subset.

In another aspect, timing messages encoded with inter-group uplink timings are contemplated. For instance, generation component 960 may be configured to generate a timing message encoded with at least one inter-group uplink timing corresponding to a target downlink group. Within such embodiment, transmitting component 940 is configured to transmit the timing message to the wireless terminal via a timing message carrier included in a messenger downlink group, wherein the target downlink group is different than the messenger downlink group. Here, it should be noted that the timing message can be encoded with an indication of the target downlink group. Similar to the intra-group embodiment discussed previously, such indication can be encoded according to a mapping of group identities shared with the wireless terminal. For example, the mapping of group identities can be configured in association with an assignment of dedicated radio resources on downlink carriers included in the target downlink group.

As illustrated, base station 900 may also include random access component 970. Within such embodiment, random access component 970 is configured to identify a random access carrier to facilitate a random access procedure, wherein the random access carrier is a carrier assigned to the wireless terminal. In an aspect, transmitting component 940 may be configured to transmit the random access carrier as part of a dedicated radio resource configuration. In another aspect, random access component 970 may be configured to ascertain a criterion associated with a usage of the random access carrier, wherein the criterion is provided to the wireless terminal with an assignment of the random access carrier. For example, the criterion can be a minimum signal quality threshold associated with the random access carrier. In yet another aspect, random access component 970 is configured to identify an alternative carrier to facilitate a performing of the random access procedure by the wireless terminal on the alternative carrier in response to the criterion not being met by the random access carrier.

Figure 10:
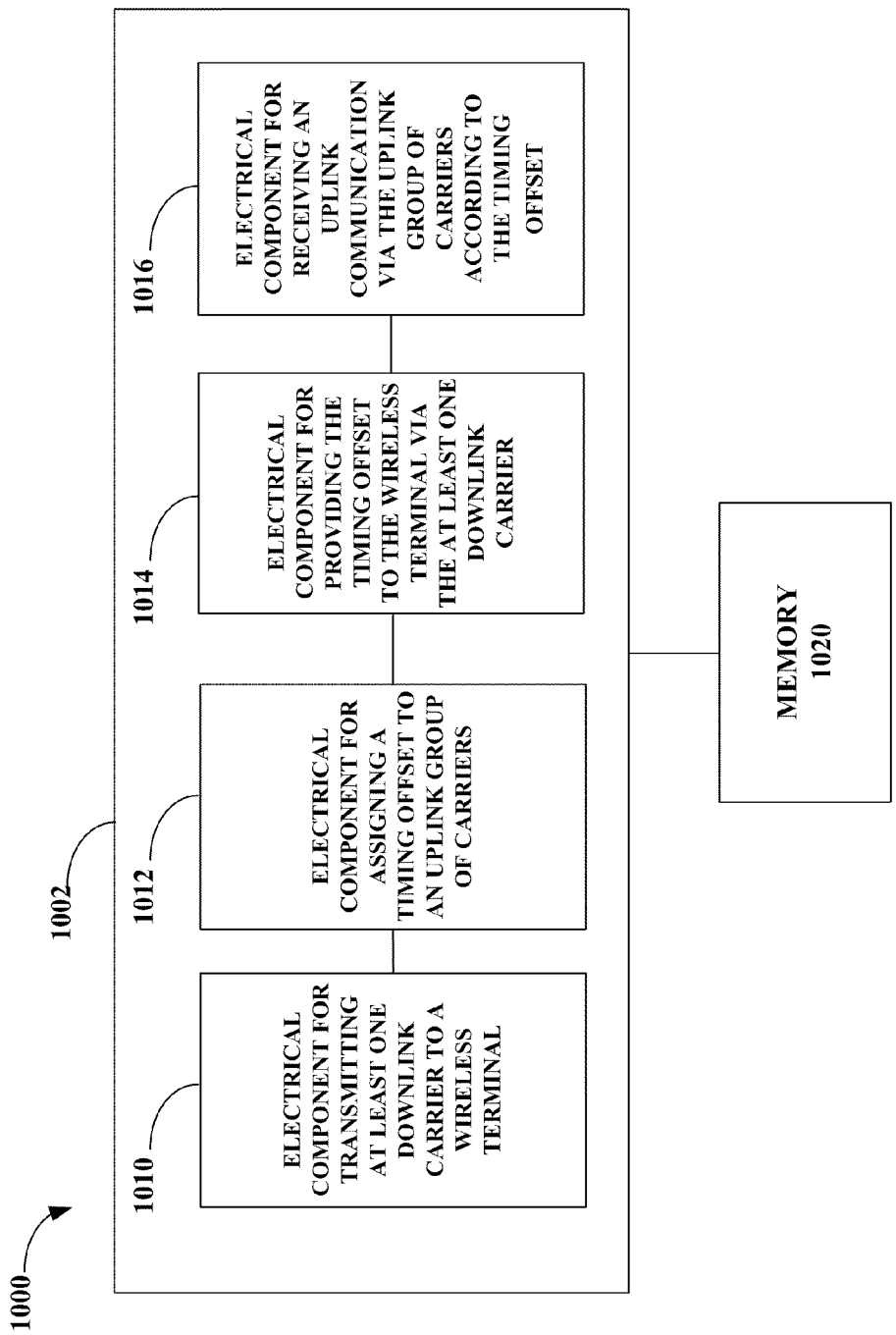
FIG. 10 is an illustration of an exemplary coupling of electrical components that effectuate a timing alignment in a multicarrier system.

Referring next to FIG. 10, illustrated is a system 1000 that facilitates a timing alignment in a multicarrier system according to an embodiment. System 1000 and/or instructions for implementing system 1000 can reside within a network entity (e.g., base station 900) or a computer-readable storage medium, for instance, wherein system 1000 includes functional blocks that can represent functions implemented by a processor, software, or combination thereof (e.g., firmware). Moreover, system 1000 includes a logical grouping 1002 of electrical components that can act in conjunction similar to logical grouping 702 in system 700. As illustrated, logical grouping 1002 can include an electrical component for transmitting at least one downlink carrier to a wireless terminal 1010, as well as an electrical component for assigning a timing offset to an uplink group of carriers 1012. Furthermore, logical grouping 1002 can include an electrical component for providing the timing offset to the wireless terminal via the at least one downlink carrier 1014. Logical grouping 1002 can also include an electrical component for receiving an uplink communication via the uplink group of carriers according to the timing offset 1016. Additionally, system 1000 can include a memory 1020 that retains instructions for executing functions associated with electrical components 1010, 1012, 1014, and 1016. While shown as being external to memory 1020, it is to be understood that electrical components 1010, 1012, 1014, and 1016 can exist within memory 1020.

Figure 11:
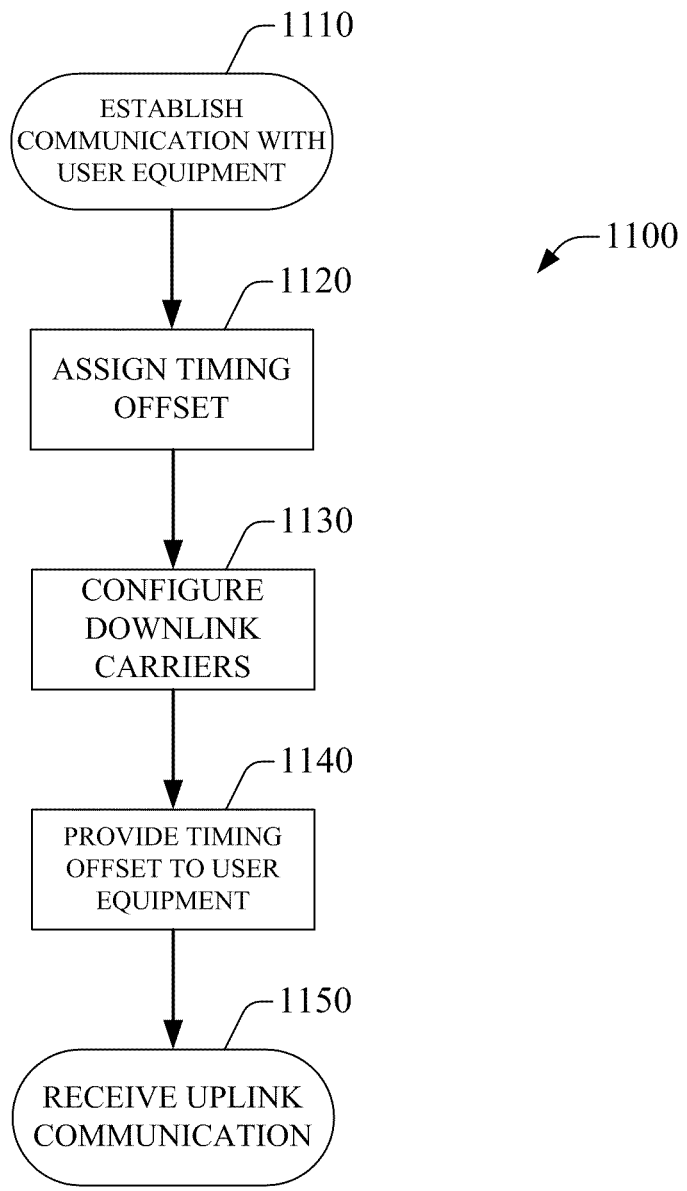
FIG. 11 is flow chart illustrating an exemplary methodology for facilitating a timing alignment in a multicarrier system in accordance with an aspect of the subject specification.

Referring next to FIG. 11, a flow chart illustrating an exemplary method that facilitates a timing alignment in a multicarrier system is provided. As illustrated, process 1100 includes a series of acts that may be performed by various components of a network entity (e.g., base station 900) according to an aspect of the subject specification. Process 1100 may be implemented by employing at least one processor to execute computer executable instructions stored on a computer readable storage medium to implement the series of acts. In another embodiment, a computer-readable storage medium comprising code which causes at least one computer to implement the acts of process 1100 is contemplated.

In an aspect, process 1100 begins with a multicarrier communication being established with a user equipment at act 1110. Next, at act 1120, a timing offset is assigned to an uplink group of carriers, wherein a different timing offset may be assigned to each of a plurality of uplink groups. Once the timing offsets have been assigned, process 1100 proceeds to act 1130 where particular downlink carriers are configured to facilitate a downlink communication with the user equipment. At act 1140, the timing offset is then provided to the user equipment via at least one of the downlink carriers configured at act 1130. Process 1100 then concludes at act 1150 where an uplink communication is received from the user equipment according to the timing offset assigned at act 1120.

Exemplary Communication System

Figure 12:
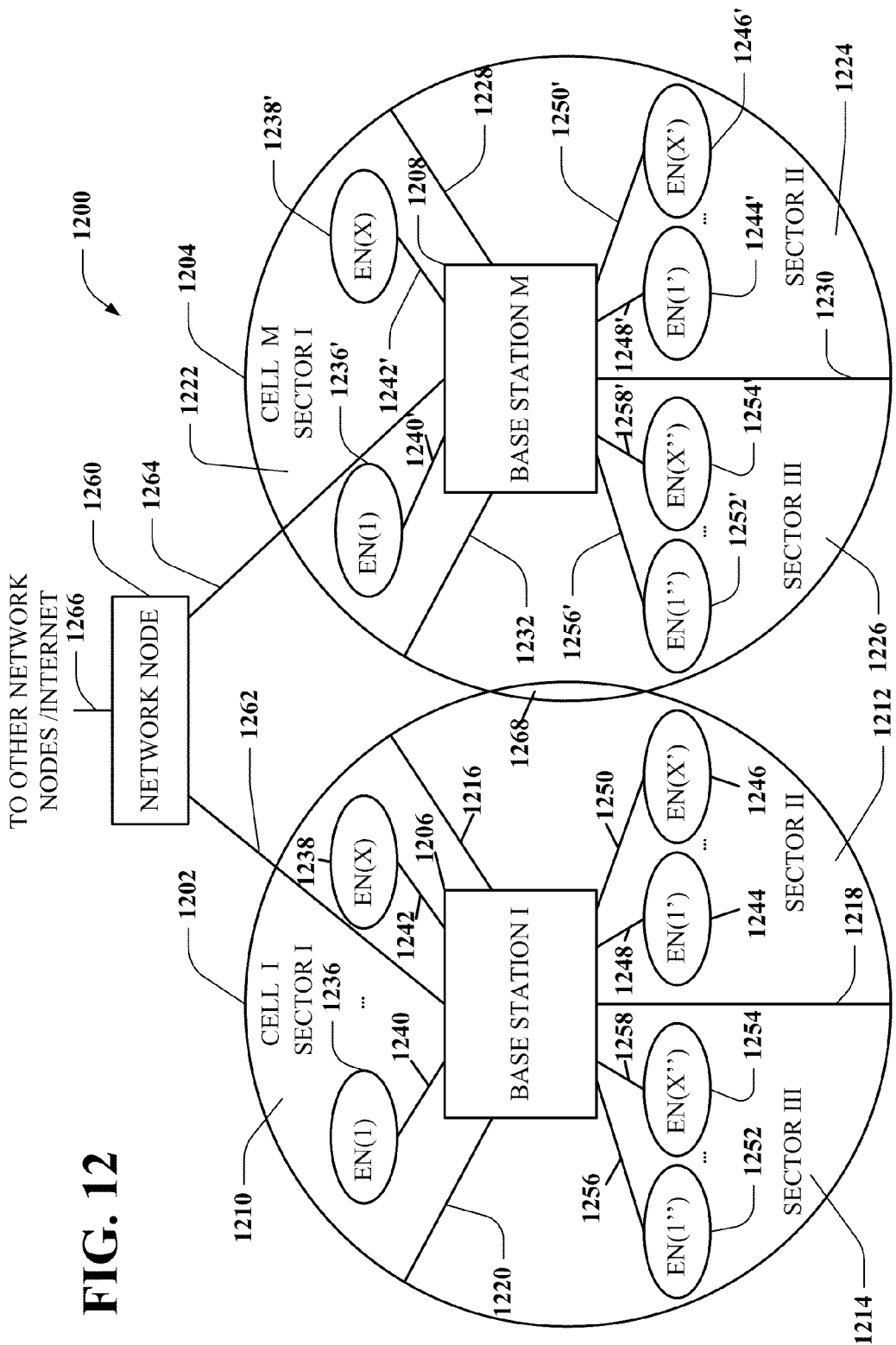
FIG. 12 is an illustration of an exemplary communication system implemented in accordance with various aspects including multiple cells.

Referring next to FIG. 12, an exemplary communication system 1200 implemented in accordance with various aspects is provided including multiple cells: cell 11202, cell M 1204. Here, it should be noted that neighboring cells 1202, 1204 overlap slightly, as indicated by cell boundary region 1268, thereby creating potential for signal interference between signals transmitted by base stations in neighboring cells. Each cell 1202, 1204 of system 1200 includes three sectors. Cells which have not been subdivided into multiple sectors (N=1), cells with two sectors (N=2) and cells with more than 3 sectors (N>3) are also possible in accordance with various aspects. Cell 1202 includes a first sector, sector I 1210, a second sector, sector II 1212, and a third sector, sector III 1214. Each sector 1210, 1212, and 1214 has two sector boundary regions; each boundary region is shared between two adjacent sectors.

Sector boundary regions provide potential for signal interference between signals transmitted by base stations in neighboring sectors. Line 1216 represents a sector boundary region between sector I 1210 and sector II 1212; line 1218 represents a sector boundary region between sector II 1212 and sector III 1214; line 1220 represents a sector boundary region between sector III 1214 and sector I 1210. Similarly, cell M 1204 includes a first sector, sector I 1222, a second sector, sector II 1224, and a third sector, sector III 1226. Line 1228 represents a sector boundary region between sector I 1222 and sector II 1224; line 1230 represents a sector boundary region between sector II 1224 and sector III 1226; line 1232 represents a boundary region between sector III 1226 and sector I 1222. Cell I 1202 includes a base station (BS), base station I 1206, and a plurality of end nodes (ENs) in each sector 1210, 1212, 1214. Sector I 1210 includes EN(1) 1236 and EN(X) 1238 coupled to BS 1206 via wireless links 1240, 1242, respectively; sector II 1212 includes EN(1') 1244 and EN(X') 1246 coupled to BS 1206 via wireless links 1248, 1250, respectively; sector III 1214 includes EN(1") 1252 and EN(X") 1254 coupled to BS 1206 via wireless links 1256, 1258, respectively. Similarly, cell M 1204 includes base station M 1208, and a plurality of end nodes (ENs) in each sector 1222, 1224, and 1226. Sector I 1222 includes EN(1) 1236' and EN(X) 1238' coupled to BS M 1208 via wireless links 1240', 1242', respectively; sector II 1224 includes EN(1') 1244' and EN(X') 1246' coupled to BS M 1208 via wireless links 1248', 1250', respectively; sector III 1226 includes EN(1") 1252' and EN(X") 1254' coupled to BS 1208 via wireless links 1256', 1258', respectively.

System 1200 also includes a network node 1260 which is coupled to BS I 1206 and BS M 1208 via network links 1262, 1264, respectively. Network node 1260 is also coupled to other network nodes, e.g., other base stations, AAA server nodes, intermediate nodes, routers, etc. and the Internet via network link 1266. Network links 1262, 1264, 1266 may be, e.g., fiber optic cables. Each end node, e.g. EN 1 1236 may be a wireless terminal including a transmitter as well as a receiver. The wireless terminals, e.g., EN(1) 1236 may move through system 1200 and may communicate via wireless links with the base station in the cell in which the EN is currently located. The wireless terminals, (WTs), e.g. EN(1) 1236, may communicate with peer nodes, e.g., other WTs in system 1200 or outside system 1200 via a base station, e.g. BS 1206, and/or network node 1260. WTs, e.g., EN(1) 1236 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 13:
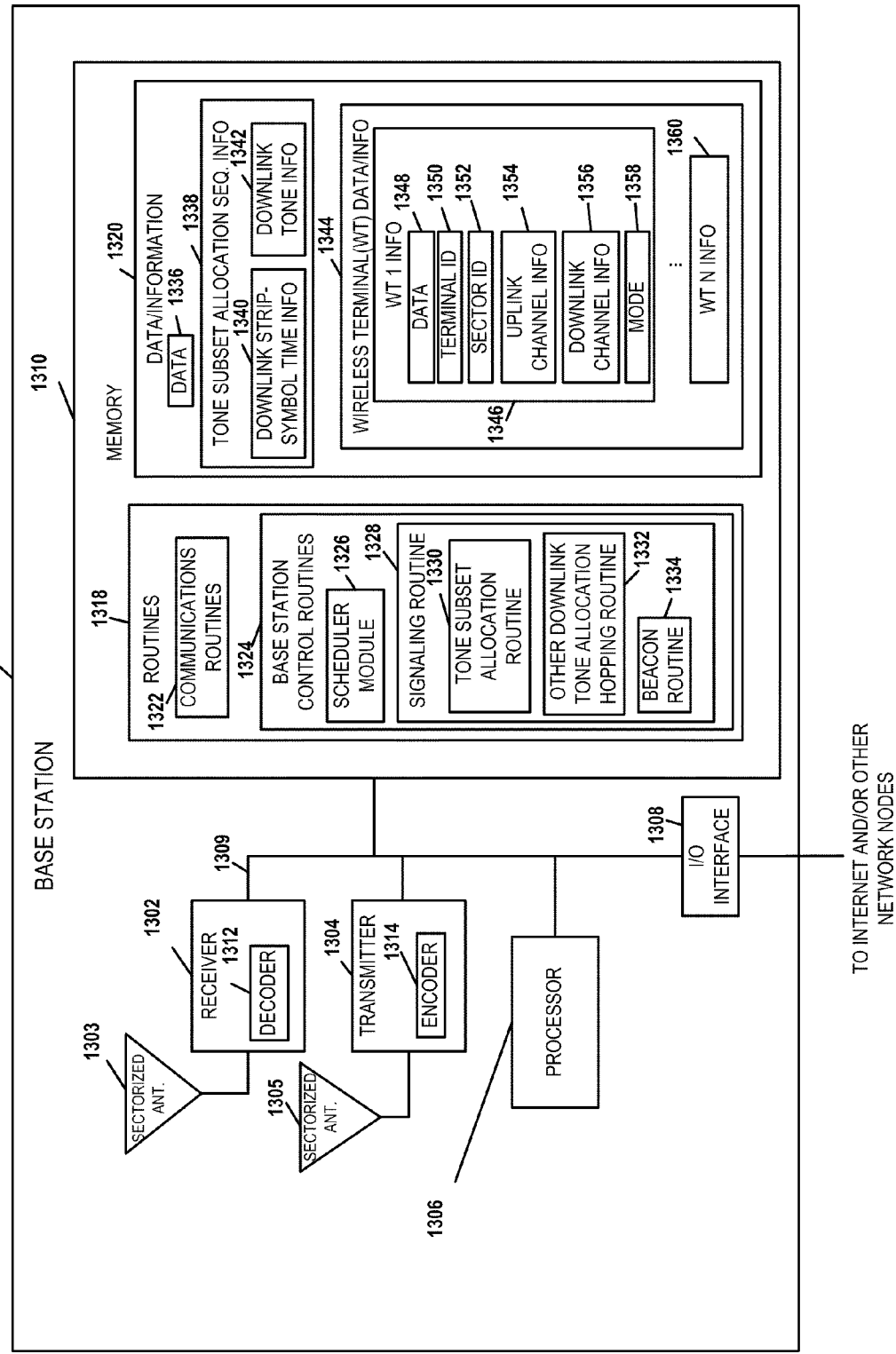
FIG. 13 is an illustration of an exemplary base station in accordance with various aspects described herein.

FIG. 13 illustrates an example base station 1300 in accordance with various aspects. Base station 1300 implements tone subset allocation sequences, with different tone subset allocation sequences generated for respective different sector types of the cell. Base station 1300 may be used as any one of base stations 1206, 1208 of the system 1200 of FIG. 12. The base station 1300 includes a receiver 1302, a transmitter 1304, a processor 1306, e.g., CPU, an input/output interface 1308 and memory 1310 coupled together by a bus 1309 over which various elements 1302, 1304, 1306, 1308, and 1310 may interchange data and information.

Sectorized antenna 1303 coupled to receiver 1302 is used for receiving data and other signals, e.g., channel reports, from wireless terminals transmissions from each sector within the base station's cell. Sectorized antenna 1305 coupled to transmitter 1304 is used for transmitting data and other signals, e.g., control signals, pilot signal, beacon signals, etc. to wireless terminals 1400 (see FIG. 14) within each sector of the base station's cell. In various aspects, base station 1300 may employ multiple receivers 1302 and multiple transmitters 1304, e.g., an individual receivers 1302 for each sector and an individual transmitter 1304 for each sector. Processor 1306, may be, e.g., a general purpose central processing unit (CPU). Processor 1306 controls operation of base station 1300 under direction of one or more routines 1318 stored in memory 1310 and implements the methods. I/O interface 1308 provides a connection to other network nodes, coupling the BS 1300 to other base stations, access routers, AAA server nodes, etc., other networks, and the Internet. Memory 1310 includes routines 1318 and data/information 1320.

Data/information 1320 includes data 1336, tone subset allocation sequence information 1338 including downlink strip-symbol time information 1340 and downlink tone information 1342, and wireless terminal (WT) data/info 1344 including a plurality of sets of WT information: WT 1 info 1346 and WT N info 1360. Each set of WT info, e.g., WT 1 info 1346 includes data 1348, terminal ID 1350, sector ID 1352, uplink channel information 1354, downlink channel information 1356, and mode information 1358.

Routines 1318 include communications routines 1322 and base station control routines 1324. Base station control routines 1324 includes a scheduler module 1326 and signaling routines 1328 including a tone subset allocation routine 1330 for strip-symbol periods, other downlink tone allocation hopping routine 1332 for the rest of symbol periods, e.g., non strip-symbol periods, and a beacon routine 1334.

Data 1336 includes data to be transmitted that will be sent to encoder 1314 of transmitter 1304 for encoding prior to transmission to WTs, and received data from WTs that has been processed through decoder 1312 of receiver 1302 following reception. Downlink strip-symbol time information 1340 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1342 includes information including a carrier frequency assigned to the base station 1300, the number and frequency of tones, and the set of tone subsets to be allocated to the strip-symbol periods, and other cell and sector specific values such as slope, slope index and sector type.

Data 1348 may include data that WT1 1400 has received from a peer node, data that WT 1 1400 desires to be transmitted to a peer node, and downlink channel quality report feedback information. Terminal ID 1350 is a base station 1300 assigned ID that identifies WT 1 1400. Sector ID 1352 includes information identifying the sector in which WT1 1400 is operating. Sector ID 1352 can be used, for example, to determine the sector type. Uplink channel information 1354 includes information identifying channel segments that have been allocated by scheduler 1326 for WT1 1400 to use, e.g., uplink traffic channel segments for data, dedicated uplink control channels for requests, power control, timing control, etc. Each uplink channel assigned to WT1 1400 includes one or more logical tones, each logical tone following an uplink hopping sequence. Downlink channel information 1356 includes information identifying channel segments that have been allocated by scheduler 1326 to carry data and/or information to WT1 1400, e.g., downlink traffic channel segments for user data. Each downlink channel assigned to WT1 1400 includes one or more logical tones, each following a downlink hopping sequence. Mode information 1358 includes information identifying the state of operation of WT1 1400, e.g. sleep, hold, on.

Communications routines 1322 control the base station 1300 to perform various communications operations and implement various communications protocols. Base station control routines 1324 are used to control the base station 1300 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1328 controls the operation of receiver 1302 with its decoder 1312 and transmitter 1304 with its encoder 1314. The signaling routine 1328 is responsible controlling the generation of transmitted data 1336 and control information. Tone subset allocation routine 1330 constructs the tone subset to be used in a strip-symbol period using the method of the aspect and using data/info 1320 including downlink strip-symbol time info 1340 and sector ID 1352. The downlink tone subset allocation sequences will be different for each sector type in a cell and different for adjacent cells. The WTs 1400 receive the signals in the strip-symbol periods in accordance with the downlink tone subset allocation sequences; the base station 1300 uses the same downlink tone subset allocation sequences in order to generate the transmitted signals. Other downlink tone allocation hopping routine 1332 constructs downlink tone hopping sequences, using information including downlink tone information 1342, and downlink channel information 1356, for the symbol periods other than the strip-symbol periods. The downlink data tone hopping sequences are synchronized across the sectors of a cell. Beacon routine 1334 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 14:
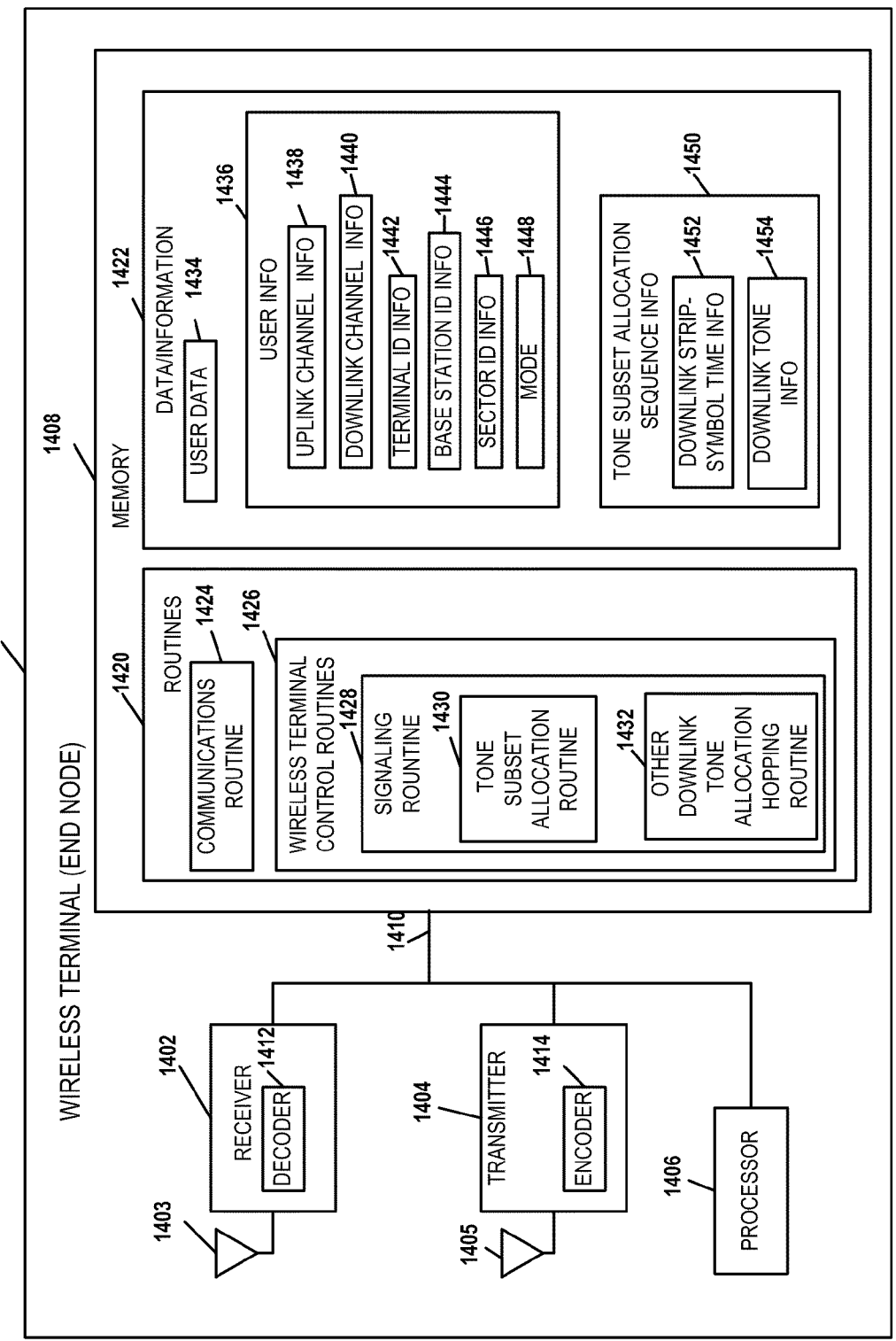
FIG. 14 is an illustration of an exemplary wireless terminal implemented in accordance with various aspects described herein.

FIG. 14 illustrates an example wireless terminal (end node) 1400 which can be used as any one of the wireless terminals (end nodes), e.g., EN(1) 1236, of the system 1200 shown in FIG. 12. Wireless terminal 1400 implements the tone subset allocation sequences. The wireless terminal 1400 includes a receiver 1402 including a decoder 1412, a transmitter 1404 including an encoder 1414, a processor 1406, and memory 1408 which are coupled together by a bus 1410 over which the various elements 1402, 1404, 1406, 1408 can interchange data and information. An antenna 1403 used for receiving signals from a base station (and/or a disparate wireless terminal) is coupled to receiver 1402. An antenna 1405 used for transmitting signals, e.g., to a base station (and/or a disparate wireless terminal) is coupled to transmitter 1404.

The processor 1406, e.g., a CPU controls the operation of the wireless terminal 1400 and implements methods by executing routines 1420 and using data/information 1422 in memory 1408.

Data/information 1422 includes user data 1434, user information 1436, and tone subset allocation sequence information 1450. User data 1434 may include data, intended for a peer node, which will be routed to encoder 1414 for encoding prior to transmission by transmitter 1404 to a base station, and data received from the base station which has been processed by the decoder 1412 in receiver 1402. User information 1436 includes uplink channel information 1438, downlink channel information 1440, terminal ID information 1442, base station ID information 1444, sector ID information 1446, and mode information 1448. Uplink channel information 1438 includes information identifying uplink channels segments that have been assigned by a base station for wireless terminal 1400 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1440 includes information identifying downlink channel segments that have been assigned by a base station to WT 1400 for use when the base station is transmitting data/information to WT 1400. Downlink channels may include downlink traffic channels and assignment channels, each downlink channel including one or more logical tone, each logical tone following a downlink hopping sequence, which is synchronized between each sector of the cell.

User info 1436 also includes terminal ID information 1442, which is a base station-assigned identification, base station ID information 1444 which identifies the specific base station that WT has established communications with, and sector ID info 1446 which identifies the specific sector of the cell where WT 1400 is presently located. Base station ID 1444 provides a cell slope value and sector ID info 1446 provides a sector index type; the cell slope value and sector index type may be used to derive tone hopping sequences. Mode information 1448 also included in user info 1436 identifies whether the WT 1400 is in sleep mode, hold mode, or on mode.

Tone subset allocation sequence information 1450 includes downlink strip-symbol time information 1452 and downlink tone information 1454. Downlink strip-symbol time information 1452 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1454 includes information including a carrier frequency assigned to the base station, the number and frequency of tones, and the set of tone subsets to be allocated to the strip-symbol periods, and other cell and sector specific values such as slope, slope index and sector type.

Routines 1420 include communications routines 1424 and wireless terminal control routines 1426. Communications routines 1424 control the various communications protocols used by WT 1400. Wireless terminal control routines 1426 controls basic wireless terminal 1400 functionality including the control of the receiver 1402 and transmitter 1404. Wireless terminal control routines 1426 include the signaling routine 1428. The signaling routine 1428 includes a tone subset allocation routine 1430 for the strip-symbol periods and an other downlink tone allocation hopping routine 1432 for the rest of symbol periods, e.g., non strip-symbol periods. Tone subset allocation routine 1430 uses user data/info 1422 including downlink channel information 1440, base station ID info 1444, e.g., slope index and sector type, and downlink tone information 1454 in order to generate the downlink tone subset allocation sequences in accordance with some aspects and process received data transmitted from the base station. Other downlink tone allocation hopping routine 1430 constructs downlink tone hopping sequences, using information including downlink tone information 1454, and downlink channel information 1440, for the symbol periods other than the strip-symbol periods. Tone subset allocation routine 1430, when executed by processor 1406, is used to determine when and on which tones the wireless terminal 1400 is to receive one or more strip-symbol signals from the base station 1300. The uplink tone allocation hopping routine 1430 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates a timing alignment in a multi-carrier system, the method comprising:
    determining different downlink timings associated with a plurality of downlink carriers;
    ascertaining an uplink timing associated with an uplink group of carriers including a first uplink carrier and a second uplink carrier, wherein the uplink timing is ascertained based on a processing of at least one downlink timing of the different downlink timings and a timing offset associated with the uplink group of carriers, and the at least one downlink timing of the different downlink timings; and
    transmitting on the first uplink carrier at the uplink timing adjusted based on the timing offset associated with the at least one downlink timing of the different downlink timings, and on the second uplink carrier at the adjusted uplink timing.

2. The method of claim 1, further comprising performing a random access procedure on at least one random access carrier, wherein the at least one random access carrier is included in a downlink group of carriers that includes at least one downlink carrier of the plurality of downlink carriers.

3. The method of claim 2, wherein the performing comprises performing the random access procedure on a single carrier.

4. The method of claim 3, wherein the single carrier is an assigned carrier provided by a network prior to the performing of the random access procedure.

5. The method of claim 4, further comprising receiving the single carrier as part of a dedicated radio resource configuration.

6. The method of claim 4, further comprising receiving a criterion associated with a usage of the single carrier, wherein the criterion is received with an assignment of the single carrier.

7. The method of claim 6, wherein the criterion is a minimum signal quality threshold associated with the single carrier.

8. The method of claim 6, wherein the performing comprises performing the random access procedure on an alternative carrier in response to the criterion not being met by the single carrier, and wherein the receiving further comprises receiving an indication of the alternative carrier from the network.

9. The method of claim 6, wherein the performing comprises performing the random access procedure on an alternative carrier in response to the criterion not being met by the single carrier, and wherein the alternative carrier is independently selected by a wireless terminal.

10. The method of claim 3, further comprising selecting the single carrier, wherein the single carrier is independently selected by a wireless terminal.

11. The method of claim 10, wherein the selecting comprises applying a determination function across a set of available carriers in the downlink group of carriers.

12. The method of claim 11, wherein the determination function is a pseudorandom function.

13. The method of claim 11, wherein the determination function is a hash function.

14. The method of claim 13, further comprising inputting an identifier associated with the wireless terminal into the hash function.

15. The method of claim 13, further comprising inputting an identifier associated with a network node into the hash function, wherein the downlink group of carriers is controlled by the network node.

16. The method of claim 13, further comprising inputting a time-varying value into the hash function.

17. The method of claim 16, further comprising determining the time-varying value via a time measurement taken from within the wireless terminal.

18. The method of claim 16, further comprising modifying the time-varying value by an arithmetic operation each time the time-varying value is used.

19. The method of claim 10, wherein the selecting is performed at a time when radio resources are assigned to the wireless terminal on any of the downlink group of carriers.

20. The method of claim 10, wherein the selecting is performed in response to a triggering of the random access procedure.

21. An apparatus configured to facilitate a timing alignment in a multicarrier system, the apparatus comprising:
a processor configured to execute computer executable components stored in memory, the components including:
a downlink timing component configured to determine different downlink timing associated with a plurality of downlink carriers;
an uplink timing component configured to ascertain an uplink timing associated with an uplink group of carriers including a first uplink carrier and a second uplink carrier, wherein the uplink timing is ascertained based on at least one downlink timing of the different downlink timings and a timing offset associated with the uplink group of carriers and the at least one downlink timing of the different downlink timings; and
a communication component configured to transmit on the first uplink carrier at the uplink timing adjusted based on the timing offset associated with the at least one downlink timing of the different downlink timings, and on the second uplink carrier at the adjusted uplink timing.

22. The apparatus of claim 21, wherein the uplink timing component is configured to determine the uplink timing by utilizing a different timing offset for each of a plurality of uplink group of carriers.

23. The apparatus of claim 21, wherein the uplink timing component is configured to determine the uplink timing by utilizing a different downlink timing for each of a plurality of uplink group of carriers.

24. The apparatus of claim 21, wherein at least one downlink carrier of the plurality of downlink carriers is included in one of a plurality of downlink groups, and wherein the uplink timing component is configured to determine the uplink timing by associating the uplink group of carriers with the one of the plurality of downlink groups.

25. The apparatus of claim 24, wherein the uplink timing component is configured to determine a plurality of uplink timings respectively associated with a plurality of uplink groups by identifying a subset of downlink groups that include an assigned carrier, and wherein the plurality of uplink groups are respectively associated with the subset of downlink groups that include the assigned carrier.

26. The apparatus of claim 24, further comprising a message processing component configured to process a received timing message encoded with a set of uplink timing instructions respectively corresponding to an uplink group subset of the uplink group of carriers.

27. The apparatus of claim 26, wherein the received timing message is a timing advance command.

28. The apparatus of claim 26, wherein the received timing message comprises a vector encoded with timing adjustment values associated with the uplink group subset.

29. The apparatus of claim 26, wherein each uplink group within the uplink group subset includes at least one carrier with an assigned radio resource.

30. The apparatus of claim 26, wherein the uplink group of carriers comprise a set of uplink groups in which each uplink group within the set of uplink groups includes at least one carrier with an assigned radio resource, and wherein the uplink group subset is a subset of the set of uplink groups.

31. The apparatus of claim 30, wherein the uplink group subset is determined by a network entity.

32. The apparatus of claim 31, wherein the message processing component is configured to submit a request requesting the network entity to provide the uplink group subset, and wherein the uplink group subset is determined by the network entity in response to the request.

33. The apparatus of claim 30, wherein the received timing message includes an indication of which of the uplink group of carriers are included in the uplink group subset.

34. The apparatus of claim 33, wherein the message processing component is configured to decode the indication according to a mapping of group identities shared with a network.

35. The apparatus of claim 34, wherein the mapping of group identities is configured in association with an assignment of dedicated radio resources on uplink carriers within at least one uplink group of the uplink group subset.

36. The apparatus of claim 24, further comprising a message processing component configured to decode a timing message received via a timing message carrier included in a messenger downlink group, wherein the timing message is encoded with at least one inter-group uplink timing corresponding to a target downlink group, and wherein the target downlink group is different than the messenger downlink group.

37. The apparatus of claim 36, wherein the timing message includes an indication of the target downlink group.

38. The apparatus of claim 37, wherein the message processing component configured to decode the indication according to a mapping of group identities shared with a network.

39. The apparatus of claim 38, wherein the mapping of group identities is configured in association with an assignment of dedicated radio resources on downlink carriers included in the target downlink group.

40. An apparatus configured to facilitate a timing alignment in a multicarrier system, the apparatus comprising:
a processor configured to execute computer executable components stored in memory, the components including:
a downlink timing component configured to determine at least one downlink timing associated with at least one downlink carrier;
an uplink timing component configured to ascertain an uplink timing associated with an uplink group of carriers, wherein the uplink timing is ascertained based on at least one downlink timing and a timing offset associated with the uplink group of carriers;
an averaging component configured to compute an average downlink timing from a plurality of downlink timings respectively corresponding to a set of downlink carriers within a particular downlink group that includes the at least one downlink carrier, wherein the uplink timing component is configured to determine the uplink timing by applying the timing offset to the average downlink timing;

a communication component configured to transmit each of the uplink group of carriers within a threshold value of the uplink timing.

41. The apparatus of claim 40, wherein the particular downlink group comprises at least one carrier associated with an assigned radio resource.

42. The apparatus of claim 40, wherein the particular downlink group comprises a set of carriers identified by a network.

43. A computer program product that facilitates a timing alignment in a multicarrier system, comprising:
a non-transitory computer-readable storage medium comprising code for causing at least one computer to:
determine different downlink timings associated with a plurality of downlink carriers;
ascertain an uplink timing associated with an uplink group of carriers including a first uplink carrier and a second uplink carrier, wherein the uplink timing is ascertained based on at least one downlink timing of the different downlink timings and a timing offset associated with the uplink group of carriers and the at least one downlink timing of the different downlink timings; and
transmit the first uplink carrier at the uplink timing adjusted based on the timing offset associated with the at least one downlink timing of the different downlink timings, and on the second uplink carrier at the adjusted uplink timing.

44. The computer program product of claim 43, wherein the code causes the at least one computer to associate the uplink group of carriers with one of a plurality of downlink groups, and to receive a timing message encoded with a set of uplink timing instructions respectively corresponding to a downlink group subset of the plurality of downlink groups.

45. The computer program product of claim 43, wherein the code causes the at least one computer to decode a timing message received via a timing message carrier included in a messenger downlink group, and wherein the timing message is encoded with at least one inter-group uplink timing corresponding to a target downlink group different than the messenger downlink group.

46. A computer program product that facilitates a timing alignment in a multicarrier system, comprising:
a non-transitory computer-readable storage medium comprising code for causing at least one computer to:
determine at least one downlink timing associated with at least one downlink carrier;
ascertain an uplink timing associated with an uplink group of carriers, wherein the uplink timing is ascertained based on at least one downlink timing and a timing offset associated with the uplink group of carriers;
compute an average downlink timing from a plurality of downlink timings respectively corresponding to a set of downlink carriers within a particular downlink group that includes the at least one downlink carrier, and wherein the code further causes the at least one computer to determine the uplink timing by applying the timing offset to the average downlink timing; and
transmit each of the uplink group of carriers within a threshold value of the uplink timing.

47. The computer program product of claim 43, wherein the code causes the at least one computer to perform a random access procedure on at least one random access carrier, and wherein the at least one random access carrier is included in a downlink group of carriers that includes at least one downlink carrier of the plurality of downlink carriers.

48. An apparatus configured to facilitate a timing alignment in a multicarrier system, the apparatus comprising:
means for determining different downlink timings associated with a plurality of downlink carriers;
means for ascertaining an uplink timing associated with an uplink group of carriers including a first uplink carrier and a second uplink carrier, wherein the uplink timing is ascertained based on at least one downlink timing of the different downlink timings and a timing offset associated with the uplink group of carriers and the at least one downlink timing of the different downlink timings; and
means for transmitting the first uplink carrier at the uplink timing adjusted based on the timing offset associated with the at least one downlink timing of the different downlink timings, and on the second uplink carrier at the adjusted uplink timing.

49. The apparatus of claim 48, wherein the means for ascertaining is configured to utilize a different timing offset for each of a plurality of uplink group of carriers.

50. The apparatus of claim 48, wherein the means for ascertaining is configured to utilize a different downlink timing for each of a plurality of uplink group of carriers.

51. The apparatus of claim 48, wherein at least one downlink carrier of the plurality of downlink carriers is included in one of a plurality of downlink groups, and wherein the means for ascertaining is configured to associate the uplink group of carriers with the one of the plurality of downlink groups.

52. The apparatus of claim 48, further comprising means for performing a random access procedure on at least one random access carrier, wherein the at least one random access carrier is included in a downlink group of carriers that includes at least one downlink carrier of the plurality of downlink carriers.

53. A method that facilitates a timing alignment in a multicarrier system, the method comprising:
transmitting downlink communications to a wireless terminal via a plurality of downlink carriers with different downlink timings;
assigning a timing offset to an uplink group of carriers including a first uplink carrier and a second uplink carrier, the timing offset being associated with at least one downlink timing of the different downlink timings;
providing the timing offset to the wireless terminal via one of the plurality of downlink carriers; and
receiving a first uplink communication via the first uplink carrier at an uplink timing adjusted based on the timing offset associated with the at least one downlink timing of the different downlink timings, and a second uplink communication via the second uplink carrier at the adjusted uplink timing.

54. The method of claim 53, wherein the assigning comprises assigning a different timing offset to each of a plurality of uplink groups.

55. The method of claim 54, further comprising generating a timing message encoded with a set of uplink timing instructions respectively corresponding to an uplink group subset of the plurality of uplink groups, wherein the transmitting comprises transmitting the timing message to the wireless terminal.

56. The method of claim 55, wherein the timing message is a timing advance command.

57. The method of claim 55, wherein the timing message comprises a vector encoded with timing adjustment values associated with the uplink group subset.

58. The method of claim 55, wherein each uplink group within the uplink group subset includes at least one carrier with a radio resource assigned to the wireless terminal.

59. The method of claim 55, wherein the plurality of uplink groups comprise a set of uplink groups in which each uplink group within the set of uplink groups includes at least one carrier with a radio resource assigned to the wireless terminal, and wherein the uplink group subset is a subset of the set of uplink groups.

60. The method of claim 59, further comprising determining the uplink group subset.

61. The method of claim 60, further comprising receiving a request from the wireless terminal to provide the uplink group subset, wherein the determining is performed in response to the request.

62. The method of claim 59, wherein the timing message is encoded with an indication of which of the plurality of uplink groups are included in the uplink group subset.

63. The method of claim 62, wherein the indication is encoded according to a mapping of group identities shared with the wireless terminal.

64. The method of claim 63, wherein the mapping of group identities is configured in association with an assignment of dedicated radio resources on uplink carriers within at least one uplink group of the uplink group subset.

65. The method of claim 54, further comprising generating a timing message encoded with at least one inter-group uplink timing corresponding to a target downlink group, wherein the transmitting comprises transmitting the timing message to the wireless terminal via a timing message carrier included in a messenger downlink group, and wherein the target downlink group is different than the messenger downlink group.

66. The method of claim 65, wherein the timing message is encoded with an indication of the target downlink group.

67. The method of claim 66, wherein the indication is encoded according to a mapping of group identities shared with the wireless terminal.

68. The method of claim 67, wherein the mapping of group identities is configured in association with an assignment of dedicated radio resources on downlink carriers included in the target downlink group.

69. An apparatus configured to facilitate a timing alignment in a multicarrier system, the apparatus comprising:
a processor configured to execute computer executable components stored in memory, the components including:
a timing offset component configured to assign a timing offset to an uplink group of carriers including a first uplink carrier and a second uplink carrier;
a transmitting component configured to provide the timing offset to a wireless terminal via one of a plurality of downlink carriers with different downlink timings, the timing offset being associated with at least one downlink timing of the different downlink timings; and
a receiving component configured to receive a first uplink communication via the first uplink carrier at an uplink timing adjusted based on the timing offset associated with the at least one downlink timing of the different downlink timings, and a second uplink communication via the second uplink carrier at the adjusted uplink timing.

70. The apparatus of claim 69, wherein the transmitting component is configured to transmit a downlink group of carriers from antennas located at a common site.

71. The apparatus of claim 69, wherein the transmitting component is configured to identify a set of carriers respectively corresponding to a plurality of downlink timings to facilitate an averaging of the plurality of downlink timings performed by the wireless terminal.

72. The apparatus of claim 69, further comprising a random access component configured to identify a random access carrier to facilitate a random access procedure, wherein the random access carrier is a carrier assigned to the wireless terminal.

73. The apparatus of claim 72, wherein the transmitting component is configured to transmit the random access carrier as part of a dedicated radio resource configuration.

74. The apparatus of claim 72, wherein the random access component is configured to ascertain a criterion associated with a usage of the random access carrier, and wherein the criterion is provided to the wireless terminal with an assignment of the random access carrier.

75. The apparatus of claim 74, wherein the criterion is a minimum signal quality threshold associated with the random access carrier.

76. The apparatus of claim 74, wherein the random access component is configured to identify an alternative carrier to facilitate a performing of the random access procedure by the wireless terminal on the alternative carrier in response to the criterion not being met by the random access carrier.

77. A computer program product that facilitates a timing alignment in a multicarrier system, comprising:
a non-transitory computer-readable storage medium comprising code for causing at least one computer to:
transmit downlink communications via a plurality of downlink carriers with different downlink timings to a wireless terminal;
assign a timing offset to an uplink group of carriers including a first uplink carrier and a second uplink carrier, the timing offset being associated with at least one downlink timing of the different downlink timings;
provide the timing offset to the wireless terminal via one of the plurality of downlink carriers; and
receive a first uplink communication via the first uplink carrier at an uplink timing adjusted based on the timing offset associated with the at least one downlink timing of the different downlink timings, and a second uplink communication via the second uplink carrier at the adjusted uplink timing.

78. The computer program product of claim 77, wherein the code causes the at least one computer to transmit a downlink group of carriers from antennas located at a common site.

79. The computer program product of claim 77, wherein the code causes the at least one computer to assign a different timing offset to each of a plurality of uplink groups.

80. The computer program product of claim 79, wherein the code causes the at least one computer to generate a timing message encoded with a set of uplink timing instructions respectively corresponding to an uplink group subset of the plurality of uplink groups, and to transmit the timing message to the wireless terminal.

81. The computer program product of claim 77, wherein the code causes the at least one computer to identify a set of carriers respectively corresponding to a plurality of downlink timings to facilitate an averaging of the plurality of downlink timings performed by the wireless terminal.

82. The computer program product of claim 77, wherein the code causes the at least one computer to identify a random access carrier to facilitate a random access procedure, and wherein the random access carrier is a carrier assigned to the wireless terminal.

83. An apparatus configured to facilitate a timing alignment in a multicarrier system, the apparatus comprising:
- means for transmitting downlink communications via a plurality of downlink carriers with different downlink timings to a wireless terminal;
- means for assigning a timing offset to an uplink group of carriers including a first uplink carrier and a second uplink carrier, the timing offset being associated with at least one downlink timing of the different downlink timings;
- means for providing the timing offset to the wireless terminal via one of the plurality of downlink carriers; and
- means for receiving a first uplink communication via the first uplink carrier at an uplink timing adjusted based on the timing offset associated with the at least one downlink timing of the different downlink timings, and a second uplink communication via the second uplink carrier at the adjusted uplink timing.

84. The apparatus of claim 83, wherein the means for transmitting is configured to transmit a downlink group of carriers from antennas located at a common site.

85. The apparatus of claim 83, wherein the means for assigning is configured to assign a different timing offset to each of a plurality of uplink groups.

86. The apparatus of claim 85, further comprising a means for generating a timing message encoded with at least one inter-group uplink timing corresponding to a target downlink group, wherein the means for transmitting is configured to transmit the timing message to the wireless terminal via a timing message carrier included in a messenger downlink group, and wherein the target downlink group is different than the messenger downlink group.

87. The apparatus of claim 83, wherein the means for transmitting is configured to identify a set of carriers respectively corresponding to a plurality of downlink timings to facilitate an averaging of the plurality of downlink timings performed by the wireless terminal.

88. The apparatus of claim 83, wherein the means for transmitting is configured to identify a random access carrier to facilitate a random access procedure, and wherein the random access carrier is a carrier assigned to the wireless terminal.

* * * * *